US012596464B2

(12) United States Patent
Seo et al.

(10) Patent No.: US 12,596,464 B2
(45) Date of Patent: Apr. 7, 2026

(54) ELECTRONIC APPARATUS AND METHOD FOR PROVIDING USER INTERFACE THEREOF

(71) Applicant: SAMSUNG ELECTRONICS CO., LTD., Suwon-si (KR)

(72) Inventors: Jangwon Seo, Suwon-si (KR); Seokhyun Kim, Suwon-si (KR); Junggeun Kim, Suwon-si (KR); Joosun Moon, Suwon-si (KR); Arum Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 118 days.

(21) Appl. No.: 18/241,692

(22) Filed: Sep. 1, 2023

(65) Prior Publication Data

US 2024/0118789 A1 Apr. 11, 2024

Related U.S. Application Data

(63) Continuation of application No. PCT/KR2023/009426, filed on Jul. 4, 2023.

(30) Foreign Application Priority Data

Oct. 11, 2022 (KR) ........................ 10-2022-0129711

(51) Int. Cl.
*G06F 3/0482* (2013.01)
*G06F 3/04845* (2022.01)
*G06F 3/0485* (2022.01)

(52) U.S. Cl.
CPC ........ *G06F 3/0482* (2013.01); *G06F 3/04845* (2013.01); *G06F 3/0485* (2013.01)

(58) Field of Classification Search
CPC .. G06F 3/0482; G06F 3/04845; G06F 3/0485; G06F 3/04842; H04N 21/482
See application file for complete search history.

(56) References Cited

U.S. PATENT DOCUMENTS 5,317,306 A * 5/1994 Abraham .............. G06F 40/177
345/684
9,021,395 B2 4/2015 Sakata et al.
(Continued)

FOREIGN PATENT DOCUMENTS

EP 0 996 053 A2 4/2000
JP 7-119795 B2 12/1995
(Continued)

OTHER PUBLICATIONS

International Search Report dated Oct. 5, 2023, issued by the International Searching Authority in counterpart International Application No. PCT/KR2023/009426 (PCT/ISA/210).
(Continued)

*Primary Examiner* — Daniel W Parcher
(74) *Attorney, Agent, or Firm* — Sughrue Mion, PLLC

(57) ABSTRACT

An electronic apparatus includes: one or more processors are configured to: display a list comprising (i) a first group that includes one or more first graphic user interface (GUI) items and (ii) a second group that includes one or more second GUI items, display a title of the first group on at least one of an upper end or a lower end of a display of the one or more first GUI items on the display, display a title of the second group on at least one of an upper end or a lower end of a display of the second group on the display, and display a modified title of one of the first group and the second group by changing a title width of at least one of the first group or the second group on the display.

18 Claims, 17 Drawing Sheets

(56)     References Cited

U.S. PATENT DOCUMENTS

| | | | |
|---|---|---|---|
| 9,030,419 B1 * | 5/2015 | Freed | G06F 16/54 |
| | | | 345/169 |
| 9,170,727 B2 | 10/2015 | Tomiyasu et al. | |
| 9,407,901 B2 | 8/2016 | Lee et al. | |
| 9,659,015 B2 | 5/2017 | Cho et al. | |
| 10,152,205 B2 | 12/2018 | Lee et al. | |
| 10,739,966 B2 | 8/2020 | Lee et al. | |
| 11,169,662 B2 | 11/2021 | Lee et al. | |
| 11,188,208 B2 | 11/2021 | Lee et al. | |
| 11,726,645 B2 | 8/2023 | Lee et al. | |
| 2006/0123357 A1 * | 6/2006 | Okamura | G06F 3/0482 |
| | | | 715/786 |
| 2008/0082938 A1 * | 4/2008 | Buczek | G06F 40/18 |
| | | | 715/227 |
| 2009/0189903 A1 | 7/2009 | Imai et al. | |
| 2010/0175023 A1 * | 7/2010 | Gatlin | G09G 5/34 |
| | | | 715/788 |
| 2010/0188431 A1 * | 7/2010 | Groux | G09G 5/397 |
| | | | 345/684 |
| 2011/0307836 A1 | 12/2011 | Cho et al. | |
| 2012/0069396 A1 | 3/2012 | Tomiyasu et al. | |
| 2012/0086711 A1 | 4/2012 | Lee et al. | |
| 2014/0053105 A1 | 2/2014 | Sakata et al. | |
| 2014/0136968 A1 | 5/2014 | Matas et al. | |
| 2014/0298156 A1 | 10/2014 | Liang | |
| 2015/0346975 A1 | 12/2015 | Lee et al. | |

| | | | |
|---|---|---|---|
| 2016/0196017 A1 | 7/2016 | Lee et al. | |
| 2018/0196782 A1 | 7/2018 | Gray et al. | |
| 2019/0065013 A1 | 2/2019 | Lee et al. | |
| 2020/0341621 A1 | 10/2020 | Lee et al. | |
| 2021/0011609 A1 | 1/2021 | Zhang | |
| 2022/0083210 A1 | 3/2022 | Lee et al. | |

FOREIGN PATENT DOCUMENTS

| | | | |
|---|---|---|---|
| JP | 2012-68702 A | 4/2012 | |
| KR | 10-2012-0021779 A | 3/2012 | |
| KR | 10-2012-0024058 A | 3/2012 | |
| KR | 10-2016-0084239 A | 7/2016 | |
| KR | 10-1812189 B1 | 12/2017 | |
| KR | 10-2018-0132305 A | 12/2018 | |
| KR | 10-2019-0136301 A | 12/2019 | |
| KR | 10-2345992 B1 | 1/2022 | |
| KR | 10-2022-0027112 A | 3/2022 | |
| WO | 2013/057882 A1 | 4/2013 | |

OTHER PUBLICATIONS

Written Opinion dated Oct. 5, 2023, issued by the International Searching Authority in counterpart International Application No. PCT/KR2023/009426 (PCT/ISA/237).
Communication issued Aug. 7, 2025 by the European Patent Office in European Patent Application No. 23877430.1.

* cited by examiner

100

100'

FIG. 6
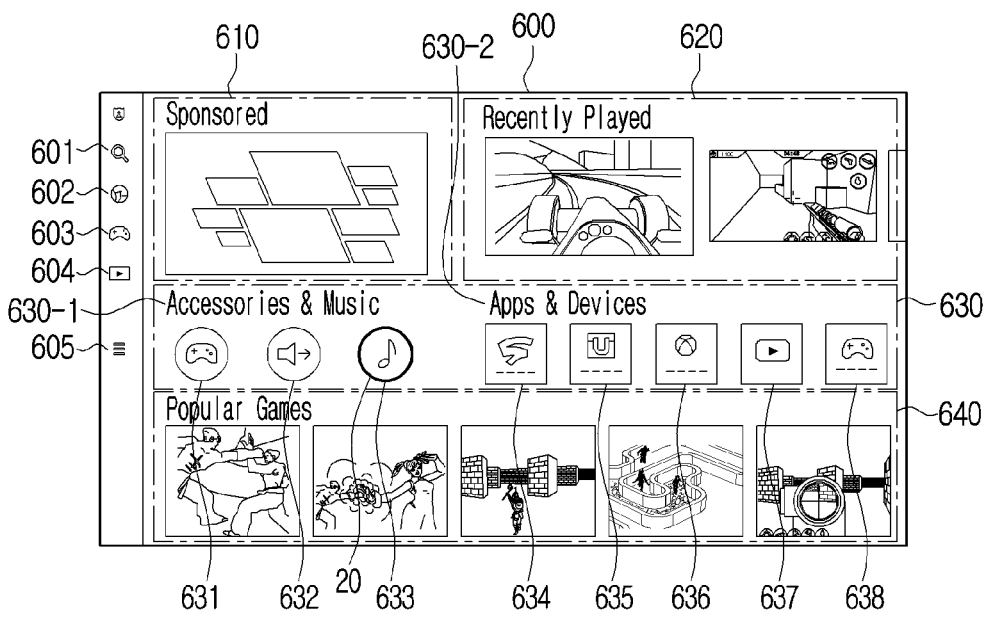
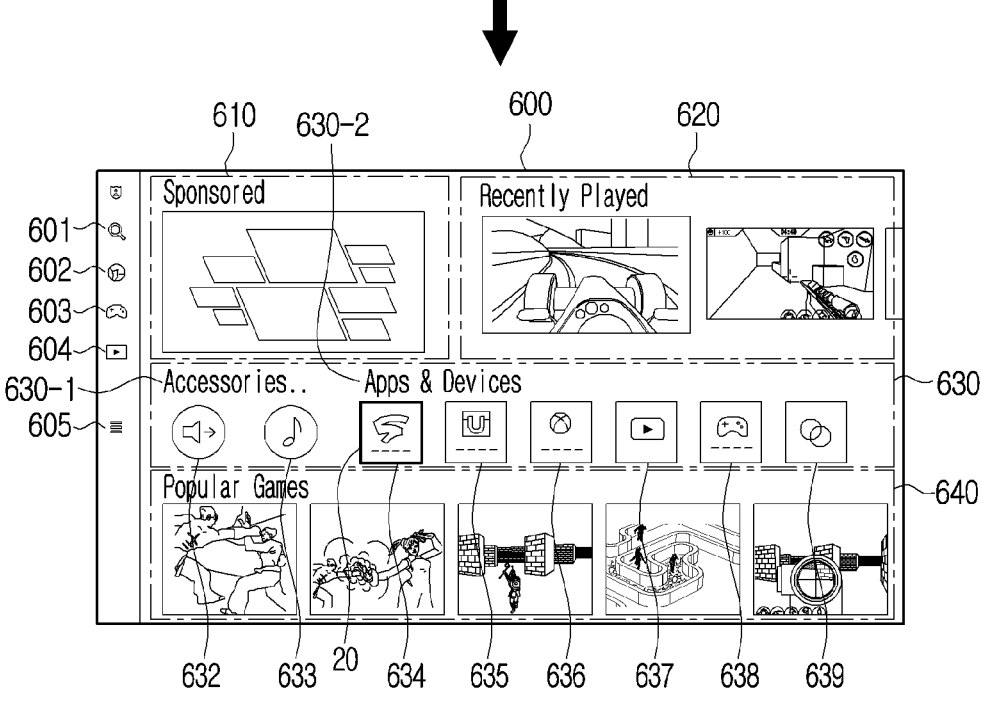

FIG. 8
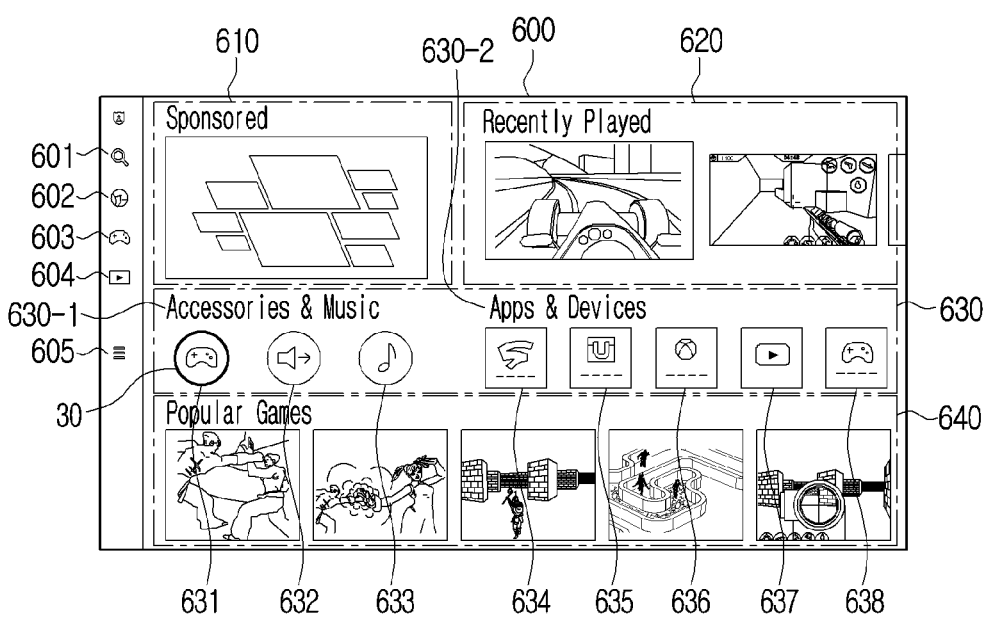
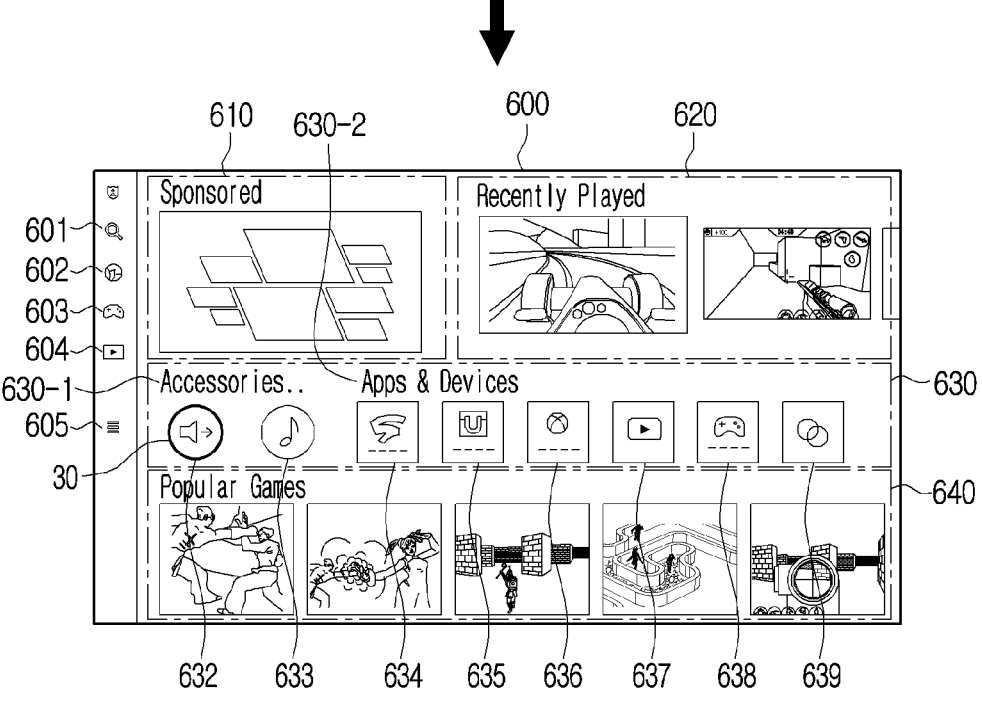

FIG. 10
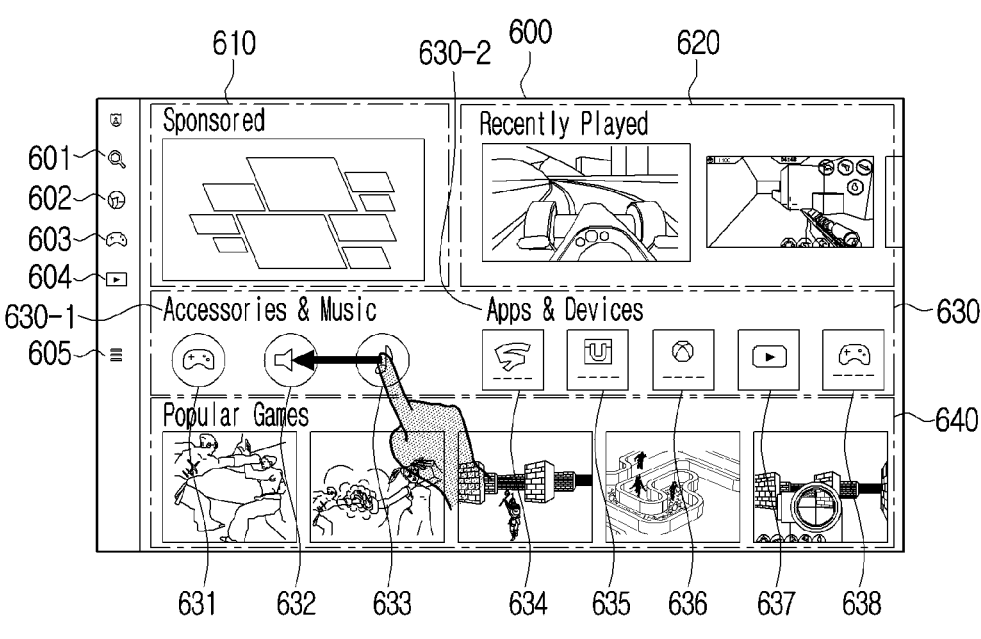
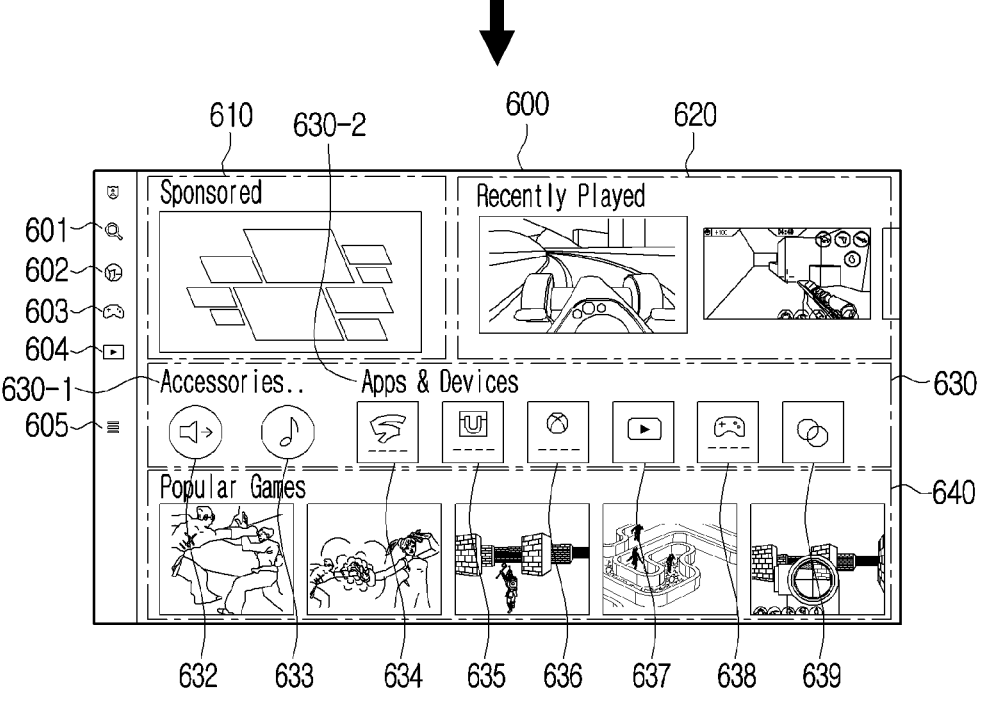

FIG. 11
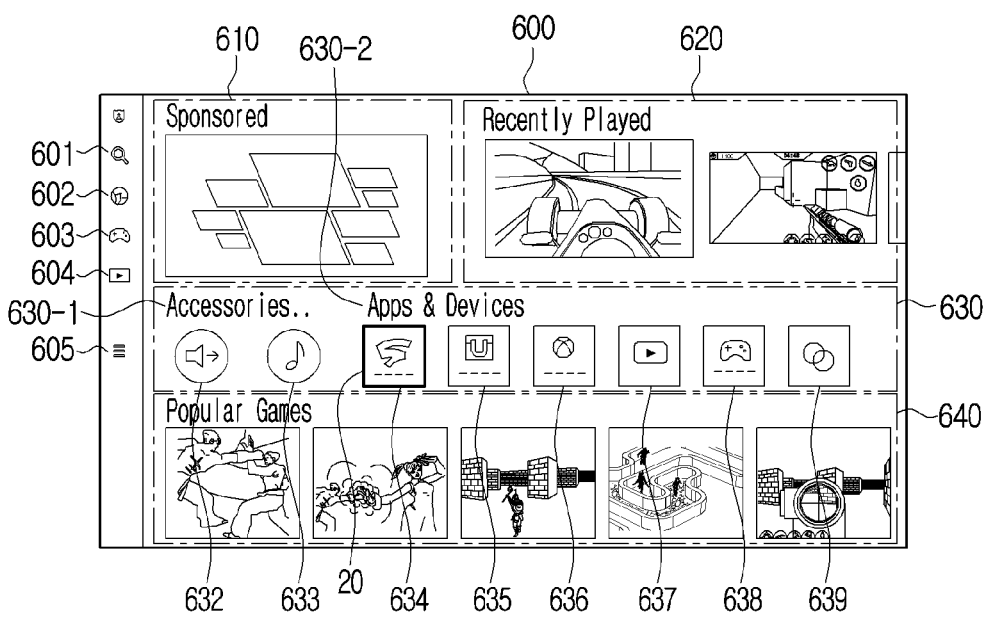
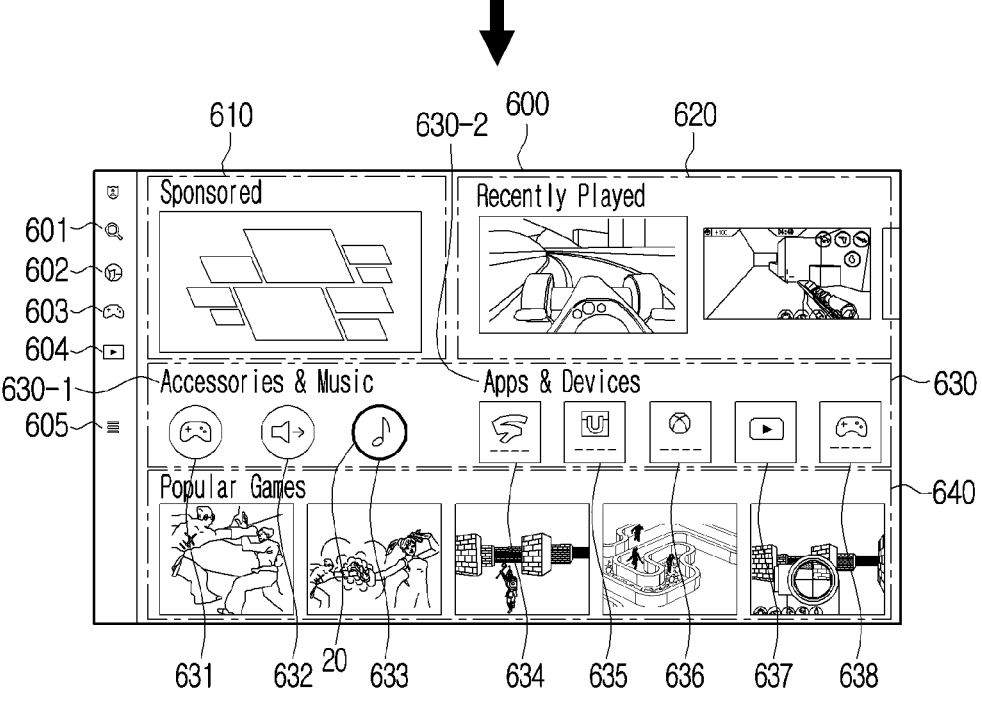

FIG. 12
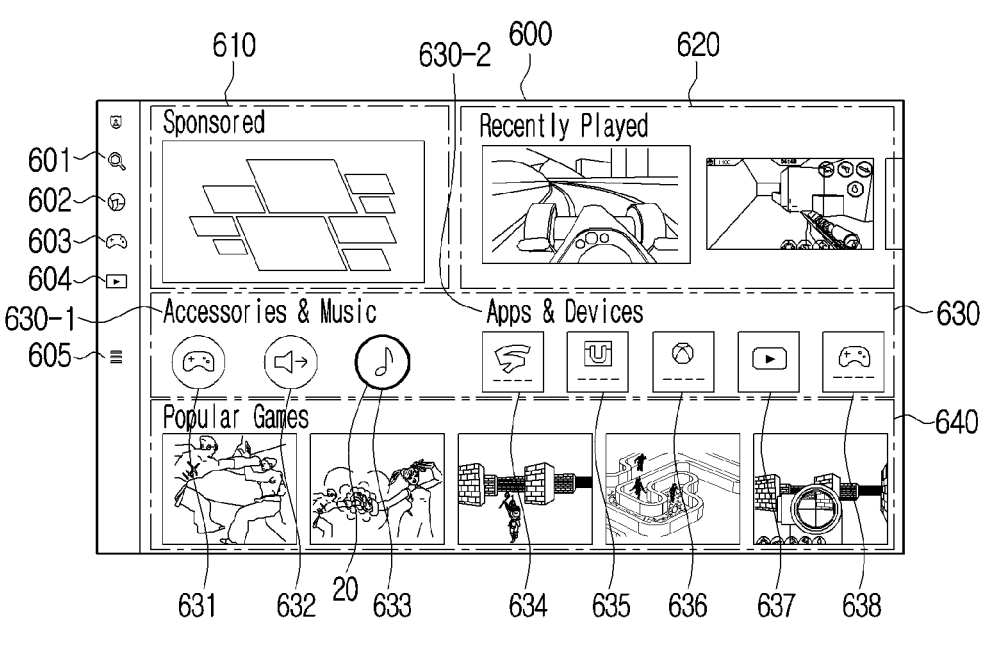
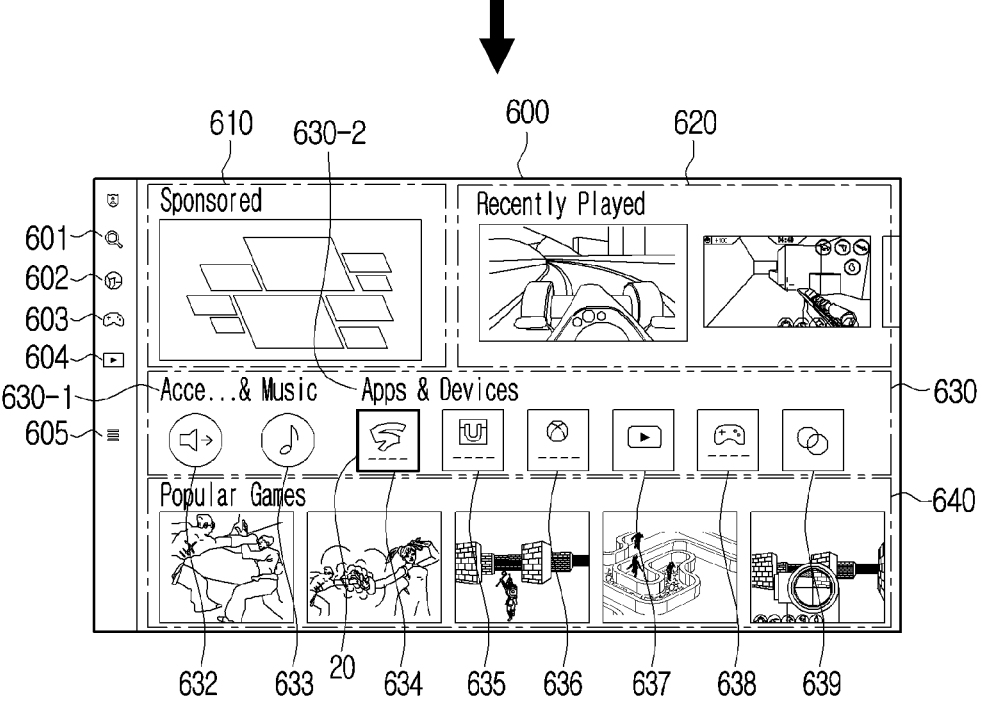

FIG. 13
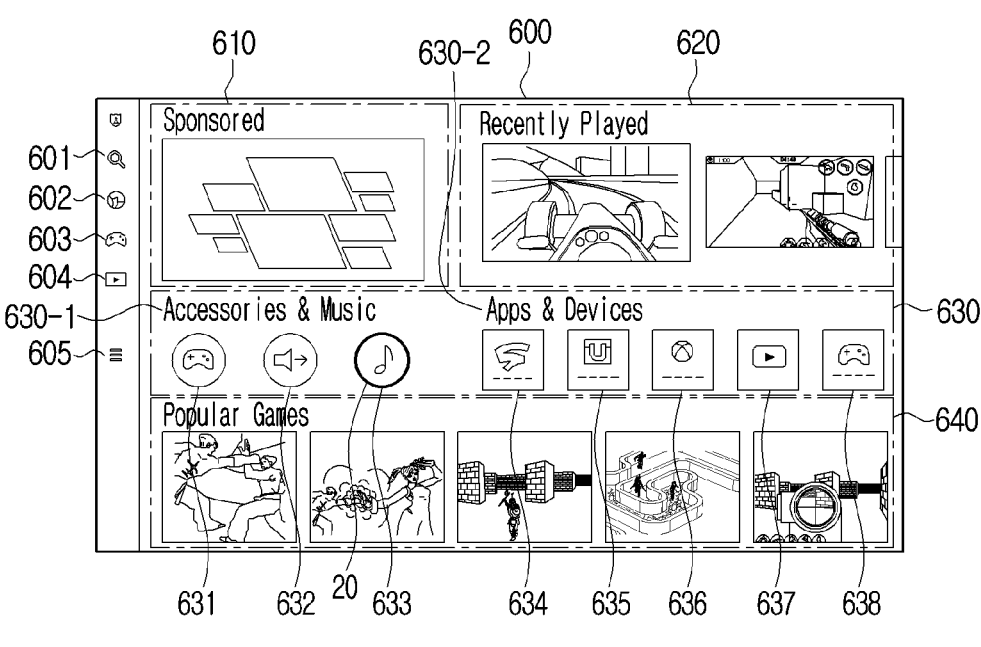
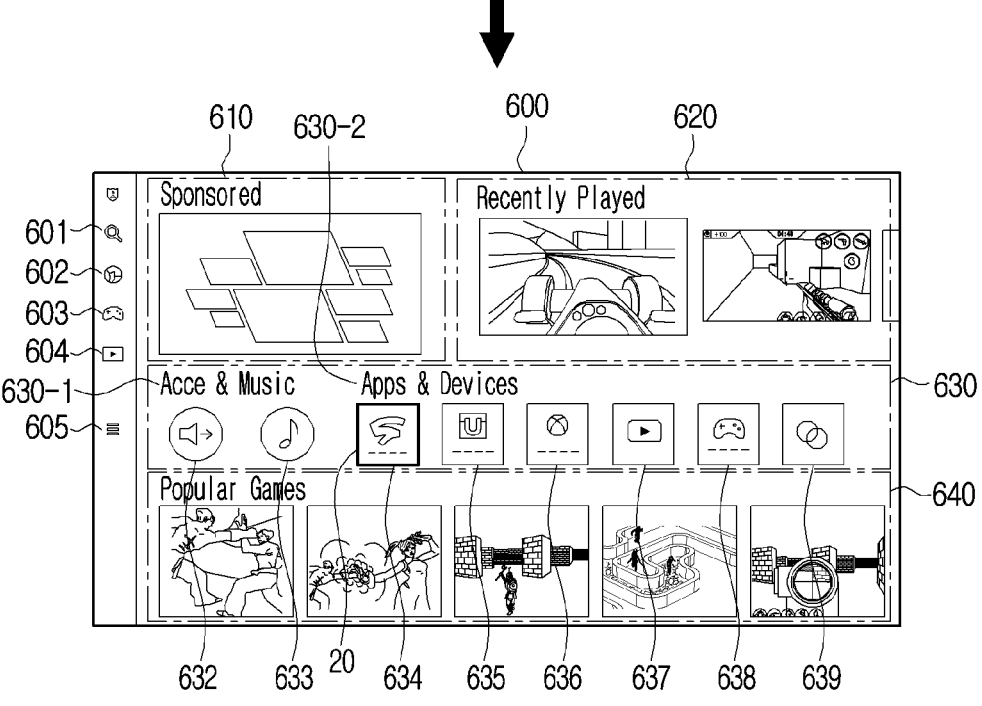

FIG. 14

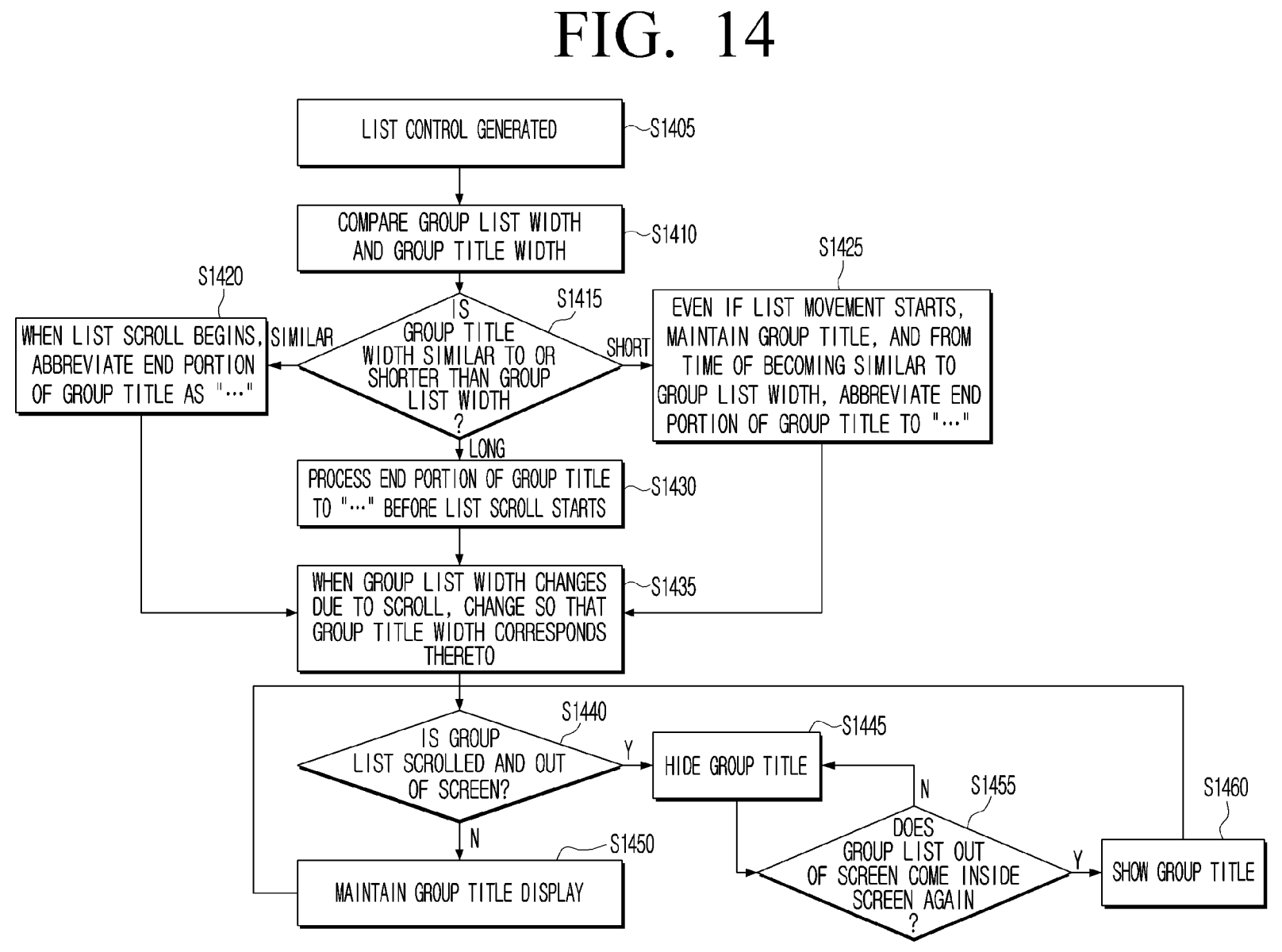

LIST CONTROL GENERATED — S1405

COMPARE GROUP LIST WIDTH AND GROUP TITLE WIDTH — S1410

IS GROUP TITLE WIDTH SIMILAR TO OR SHORTER THAN GROUP LIST WIDTH ? — S1415

SHORT → EVEN IF LIST MOVEMENT STARTS, MAINTAIN GROUP TITLE, AND FROM TIME OF BECOMING SIMILAR TO GROUP LIST WIDTH, ABBREVIATE END PORTION OF GROUP TITLE TO "..." — S1425

LONG → PROCESS END PORTION OF GROUP TITLE TO "..." BEFORE LIST SCROLL STARTS — S1430

SIMILAR → WHEN LIST SCROLL BEGINS, ABBREVIATE END PORTION OF GROUP TITLE AS "..." — S1420

WHEN GROUP LIST WIDTH CHANGES DUE TO SCROLL, CHANGE SO THAT GROUP TITLE WIDTH CORRESPONDS THERETO — S1435

IS GROUP LIST SCROLLED AND OUT OF SCREEN? — S1440

Y → HIDE GROUP TITLE — S1445

N → MAINTAIN GROUP TITLE DISPLAY — S1450

DOES GROUP LIST OUT OF SCREEN COME INSIDE SCREEN AGAIN ? — S1455

Y → SHOW GROUP TITLE — S1460

1

ELECTRONIC APPARATUS AND METHOD FOR PROVIDING USER INTERFACE THEREOF

CROSS-REFERENCE TO RELATED APPLICATION(S)

This application is a bypass continuation of International Application No. PCT/KR2023/009426, filed on Jul. 4, 2023, which is based on and claims priority to Korean Patent Application No. 10-2022-0129711, filed on Oct. 11, 2022, in the Korean Intellectual Property Office, the disclosures of which are incorporated by reference herein in their entireties.

BACKGROUND

1. Field

The disclosure relates to an electronic apparatus and a user interface (UI) providing method thereof and, more specifically, to an electronic apparatus for providing a UI screen including a plurality of graphic user interface (GUI) items and a UI providing method thereof.

2. Description of the Related Art

With the development of electronic technology, various types of electronic apparatuses have been developed. In particular, a display device, such as a TV, provides various content in order to meet the needs of users who desire a variety of functions and new experiences.

As a type of content provided from a TV varies and the number of content gradually increases, the importance of a navigation function for searching for content desired by a user is increased. However, conventional displays do not provide adequate or convenient navigation options.

SUMMARY

According to one of more embodiments, an electronic apparatus comprises: a display; a memory configured to store one or more instructions; and one or more processors connected to the display and the memory and configured to control the electronic apparatus, wherein the one or more processors are configured to, by executing the one or more instructions: display a list comprising (i) a first group that includes one or more first graphic user interface (GUI) items and (ii) a second group that includes one or more second GUI items, display a title of the first group on at least one of an upper end or a lower end of a display of the one or more first GUI items on the display, display a title of the second group on at least one of an upper end or a lower end of a display of the second group on the display, and based on a list width corresponding to at least one of the first group or the second group being changed according to a scroll input with respect to the list, display a modified title of one of the first group and the second group by changing a title width of at least one of the first group or the second group on the display.

The one or more processors are configured to, based on a list width corresponding to the first group being changed according to the scroll input with respect to the list, control the display to change the title width of the first group such that the title of the first group is displayed within the changed list width.

The one or more processors are configured to, based on determining that the GUI items included in the list are moved to one side, determining that the list width corresponding to the first group is changed, and determining that a difference between the title width of the first group and the changed list width is within a threshold width range, abbreviate an end portion of the title of the first group to include the title of the first group within the changed list width of the first group.

The one or more processors are configured to, based on determining that the list width of the first group is changed according to a reverse scroll input and determining that a difference between the title width of the first group and the changed list width is within the threshold width range, control the display to repeat a display of a text of the abbreviated portion.

The one or more processors are configured to control the display to display a movable focus item on one of the one or more first GUI items, and based on the list width corresponding to the first group being changed as the movable focus item is moved to another one of the one or more first GUI items or one of the one or more second GUI items according to the scroll input, control the display to display the modified title of the first group based on the changed list width.

The one or more processors are configured to: control the display to display a fixed focus item on one of the one or more first GUI items, and based on the list width corresponding to the first group being changed according to the scroll input, and based on another one of the one or more first GUI items is moved to a location of the fixed focus item, control the display to display the modified title of the first group based on the changed list width.

The one or more processors are configured to: control the display to display a cursor item, and based on a list width corresponding to the first group being changed according to the scroll input while a pointer item is located on one of the one or more first GUI items, control the display to display a modified title of the first group based on the changed list width.

The one or more processors are configured to, based on a list width corresponding to the first group being changed according to the scroll input with respect to the list, control the display to display the title of the first group by abbreviation based on the changed list width or the title type of the first group or replace and display the title of the first group with a summarized title.

The one or more processors are configured to: based on a list width corresponding to the first group being shortened to less than a title length of the first group based on a scroll input in a left direction, control the display to abbreviate and display at least one of a plurality of words included in the title of the first group, and based on a list width corresponding to the second group being shortened to less than a title length of the second group based on a scroll input in a right direction, control the display to abbreviate and display at least one of a plurality of words included in the title of the second group.

The one or more processors are configured to: based on a list width corresponding to the first group being shortened to less than a title length of the first group based on a scroll input in a left direction, control the display to replace and display the title of the first group with a summarized title, and based on list width corresponding to the second group being shortened to less than a title length of the second group based on a scroll input in a right direction, control the display to replace and display the title of the second group with a summarized title.

According to one or more embodiments a method of providing a user interface (UI) of an electronic apparatus, the method comprises: displaying a list comprising (i) a first group that includes one or more first graphic user interface (GUI) items and (ii) a second group including one or more second GUI items; displaying a title of the first group on at least one of an upper end or a lower end of a display of the one or more first GUI items; displaying a title of the second group on at least one of an upper end or a lower end of a display of the one or more second GUI items; and based on a list width corresponding to at least one of the first group or the second group being changed according to a scroll input with respect to the list, displaying a modified title of one of the first group and the second group by changing a title width of at least one of the first group or the second group based on the changed list width.

The displaying the modified title comprises, based on a list width corresponding to the first group being changed according to the scroll input with respect to the list, changing the title width of the first group such that the title of the first group is displayed within the changed list width.

The displaying the modified title comprises, based on determining that the GUI items included in the list are moved to one side, determining that the list width corresponding to the first group is changed, and determining that a difference between the title width of the first group and the changed list width is within a threshold width range, abbreviating an end portion of the title of the first group to include the title of the first group within the changed list width of the first group.

The method further comprising: based on determining that the list width of the first group is changed according to a reverse scroll input and determining that a difference between the title width of the first group and the changed list width is within the threshold width range, repeating displaying of a text of the abbreviated portion.

According to one or more embodiments, a non-transitory computer readable medium storing computer instructions therein, which when executed by a processor in an electronic apparatus cause the processor to perform: displaying a list comprising (i) a first group that includes one or more first graphic user interface (GUI) items and (ii) a second group including one or more second GUI items; displaying a title of the first group on at least one of an upper end or a lower end of a display of the one or more first GUI items; displaying a title of the second group on at least one of an upper end or a lower end of a display of the one or more second GUI items; and based on a list width corresponding to at least one of the first group or the second group being changed according to a scroll input with respect to the list, displaying a modified title of one of the first group and the second group by changing a title width of at least one of the first group or the second group based on the changed list width.

The displaying the modified title comprises, based on a list width corresponding to the first group being changed according to the scroll input with respect to the list, changing the title width of the first group such that the title of the first group is displayed within the changed list width.

The displaying the modified title comprises, based on determining that the GUI items included in the list are moved to one side, determining that the list width corresponding to the first group is changed, and determining that a difference between the title width of the first group and the changed list width is within a threshold width range, abbreviating an end portion of the title of the first group to include the title of the first group within the changed list width of the first group.

The instructions further cause the processor to perform: based on determining that the list width of the first group is changed according to a reverse scroll input and determining that a difference between the title width of the first group and the changed list width is within the threshold width range, repeating displaying of a text of the abbreviated portion.

The instructions further cause the processor to perform: controlling the display to display a movable focus item on one of the one or more first GUI items, and based on the list width corresponding to the first group being changed as the movable focus item is moved to another one of the one or more first GUI items or one of the one or more second GUI items according to the scroll input, controlling the display to display the modified title of the first group based on the changed list width.

The instructions further cause the processors to perform: controlling the display to display a fixed focus item on one of the one or more first GUI items, and based on the list width corresponding to the first group being changed according to the scroll input, and based on another one of the one or more first GUI items is moved to a location of the fixed focus item, controlling the display to display the modified title of the first group based on the changed list width.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 5 and 6 are diagrams illustrating a method of providing a UI screen according to a movable focusing method according to one or more embodiments of the disclosure;

FIGS. 7 and 8 are diagrams illustrating a method of providing a UI screen according to a fixed focusing method according to one or more embodiments of the disclosure;

FIG. 10 is a diagram illustrating a method of providing a UI screen according to a touch method according to one or more embodiments of the disclosure;

FIG. 11 is a diagram illustrating a method of providing a UI screen according to inverse scroll input according to one or more embodiments of the disclosure;

FIG. 12 is a diagram illustrating a method of providing a UI screen according to a scroll input according to one or more embodiments of the disclosure;

5

Figure 15A:
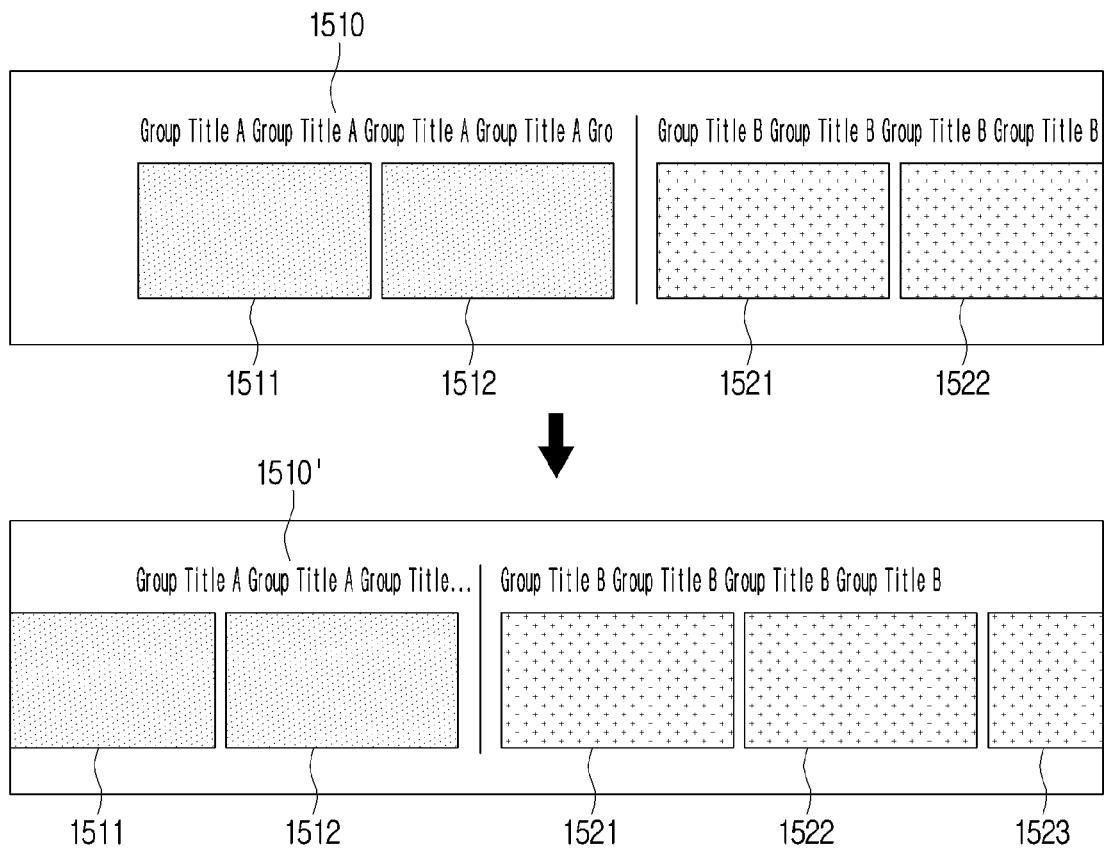
Figure 15B:
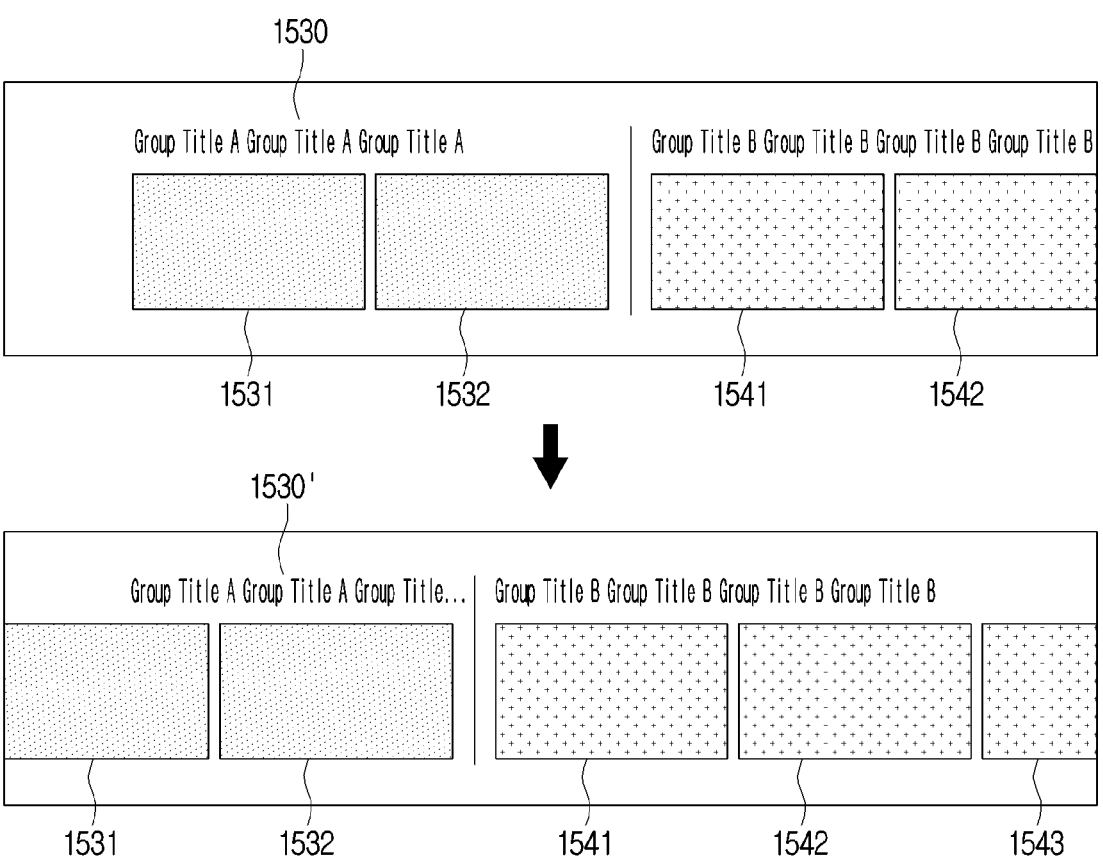

FIG. 13 is a diagram illustrating a method of providing a UI screen according to a scroll input according to one or more embodiments of the disclosure; and FIGS. 14, 15A, and 15B are diagrams illustrating one or more examples of a UI screen providing method according to one or more embodiments of the disclosure.

DETAILED DESCRIPTION

Terms used in the disclosure will be briefly described, and then the one or more embodiments will be described in detail.

The terms used in the disclosure and the claims are general terms identified in consideration of the functions of embodiments of the disclosure. However, these terms may vary depending on intention, legal or technical interpretation, emergence of new technologies, and the like of those skilled in the related art. In addition, in some cases, a term may be selected by the applicant, in which case the term will be described in detail in the description of the corresponding disclosure. Thus, the term used in this disclosure should be defined based on the meaning of term, not a simple name of the term, and the contents throughout this disclosure.

Expressions such as "have," "may have," "include," "may include" or the like represent presence of corresponding numbers, functions, operations, or parts, and do not exclude the presence of additional features.

In this disclosure, expressions such as "at least one of A [and/or] B," or "one or more of A [and/or] B," include all possible combinations of the listed items. For example, "at least one of A and B," or "at least one of A or B" includes any of (1) at least one A, (2) at least one B, or (3) at least one A and at least one B.

As used herein, terms such as "first," and "second," may identify corresponding components, regardless of order and/or importance, and are used to distinguish a component from another without limiting the components.

In addition, a description that one element (e.g., a first element) is operatively or communicatively coupled with/to" or "connected to" another element (e.g., a second element) should be interpreted to include both the first element being directly coupled to the second element, and the first element being indirectly coupled to the second element through a third element.

The expression "configured to" used in the disclosure may be interchangeably used with other expressions such as "suitable for," "having the capacity to," "designed to," "adapted to," "made to," and "capable of," depending on cases. Meanwhile, the term "configured to" does not necessarily refer to a device being "specifically designed to" in terms of hardware.

Instead, under some circumstances, the expression "a device configured to" may refer, for example, to the device being "capable of" performing an operation together with another device or component. For example, the phrase "a processor configured to perform A, B, and C" may refer, for example, to a dedicated processor (e.g., an embedded processor) for performing the corresponding operations, or a generic-purpose processor (e.g., a central processing unit (CPU) or an application processor) that can perform the corresponding operations by executing one or more software programs stored in a memory device.

A singular expression includes a plural expression, unless otherwise specified. It is to be understood that the terms such as "comprise" or "consist of" are used herein to designate a presence of a characteristic, number, step, operation, element, component, or a combination thereof, and do not to preclude a presence or a possibility of adding one or more of other characteristics, numbers, steps, operations, elements, components or a combination thereof.

The term such as "module," "unit," "part," and so on may be used to refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module and may be realized in at least one processor.

It is understood that various elements and regions in the figures may be shown out of scale. Accordingly, the scope of the disclosure is not limited by the relative sizes or spacing drawn from the accompanying drawings.

Hereinafter, with reference to the attached drawings, various example embodiments will be described in greater detail.

Figure 1:
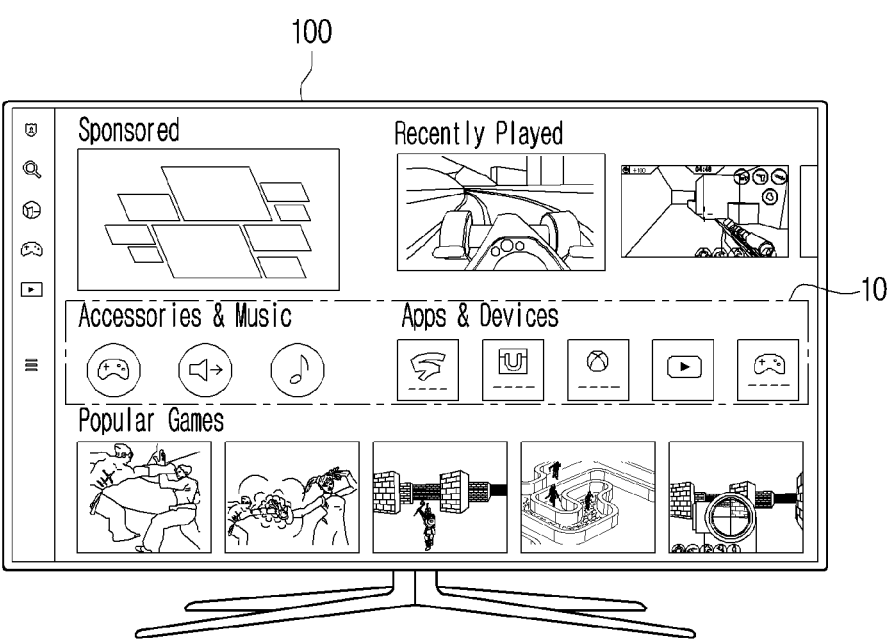
FIG. 1 is a diagram illustrating an electronic apparatus according to one or more embodiments of the disclosure.

FIG. 1 is a diagram illustrating an electronic apparatus according to one or more embodiments of the disclosure.

Referring to FIG. 1, an electronic apparatus 100 may be implemented with various types of display devices known to one of ordinary skill in the art. The electronic apparatus 100 may be implemented with any device having a display function such as a television (TV), a tablet personal computer (PC), a mobile phone, a desktop PC, a laptop PC, a personal digital assistance (PDA), a portable multimedia player (PMP), a large format display (LFD), a digital signage, a digital information display (DID), a video wall, a projector, a refrigerator, an air-conditioner, an air purifier, a medical device, or any other device known to one of ordinary skill in the art. According to one or more embodiments, the electronic apparatus 100 may be remotely controlled based on a control signal received from a device having a remote control function such as a remote control device or a user terminal for executing a remote control application. However, as understood by one of ordinary skill in the art, the electronic apparatus 100 may be controlled by a user input, for example, a user's touch input according to an implementation example.

According to one or more examples, the electronic apparatus 100 may provide a UI screen including a plurality of GUI items and control a navigation operation among the plurality of GUI items based on the navigation input received from a remote control device.

According to one or more embodiments, the electronic apparatus 100 may provide a UI screen including a plurality of GUI items having various sizes and/or various ratios and a focus item located on any one of the GUI items. In this case, the electronic apparatus 100 may move and display a plurality of GUI items arranged on the same list in one direction based on a scroll input received from a remote control device.

According to one or more embodiments, as shown in FIG. 1, different types of GUI items may be grouped. For example, GUI items corresponding to a plurality of groups may be provided in one list. In this case, a group title corresponding to each group may be provided to one side of a list corresponding to each group. For example, GUI items corresponding to the "Accessories & Music" group and GUI items corresponding to the "Apps & Devices" group may be provided in one list 10 and the title of each group may be provided in alignment in the top left of the group. In this case, when a scroll input is identified on the list 10, a list width corresponding to any one of the plurality of groups is shorter than the group title, and thus, a phenomenon in which the titles of the plurality of groups is displayed by overlapping each other may be generated.

Hereinbelow, various embodiments in which when the width of each group list is changed according to the scroll generated from the list including the plurality of groups, the width of the group title is adjusted together with the changed width to enhance the UX experience will be described.

Figure 2A:
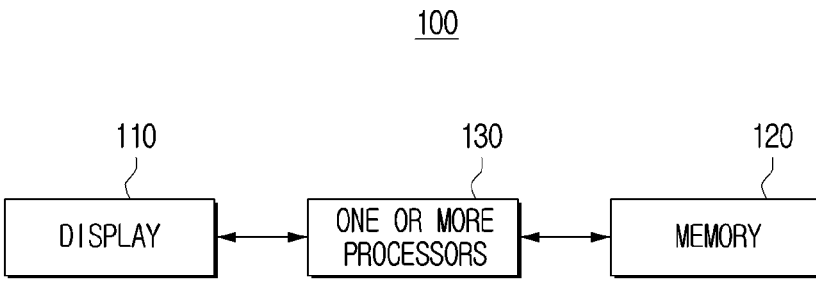
FIG. 2A is a block diagram illustrating a configuration of an electronic apparatus according to one or more embodiments of the disclosure.

FIG. 2A is a block diagram illustrating a configuration of an electronic apparatus according to one or more embodiments of the disclosure.

Referring to FIG. 2A, the electronic apparatus 100 may include a display 110, a memory 120, and one or more processors 130.

The display 110 may be implemented as a display including a self-emitting element or a display including a non-self-limiting element and a backlight. For example, the display 110 may be implemented as a display of various types such as, for example, and without limitation, a liquid crystal display (LCD), organic light emitting diodes (OLED) display, light emitting diodes (LED), micro LED, mini LED, plasma display panel (PDP), quantum dot (QD) display, quantum dot light-emitting diodes (QLED), or any other display known to one of ordinary skill in the art. In the display 110, a backlight unit, a driving circuit which may be implemented as an a-si TFT, low temperature poly silicon (LTPS) TFT, organic TFT (OTFT), or any other suitable display structure known to one of ordinary skill in the art, may be included as well. According to one or more examples, a touch sensor in a type of a touch film, a touch sheet, and a touch pad disposed in a front surface of the display 110 for sensing a touch operation may be disposed to sense various types of touch inputs. For example, the display 110 may sense various types of touch inputs such as a touch input by the hands of a user, a touch input by an input device like a stylus pen, a touch input by a specific electro-static material, any other touch input mechanisms known to one of ordinary skill in the art. In one or more examples, the input device may be implemented as a pen-type input device which may be referred to as various terms like an electronic pen, a stylus pen, an S-pen, or any other suitable pen known to one of ordinary skill in the art. According to one or more embodiments, the display 110 may be implemented with a flat display, a curved display, a foldable or/and rollable display, or any other display configuration known to one of ordinary skill in the art.

The memory 120 may store data necessary for various embodiments. The memory 120 may be implemented as a memory embedded in an electronic apparatus 100', or may be implemented as a removable memory in the electronic apparatus 100', according to the data usage purpose. For example, data for driving the electronic apparatus 100 may be stored in a memory embedded in the electronic apparatus 100', and data for an additional function of the electronic apparatus 100 may be stored in the memory detachable to the electronic apparatus 100. A memory embedded in the electronic apparatus 100 may be a volatile memory such as a dynamic random access memory (DRAM), a static random access memory (SRAM), a synchronous dynamic random access memory (SDRAM), or a nonvolatile memory (for example, one time programmable ROM (OTPROM), programmable ROM (PROM), erasable and programmable ROM (EPROM), electrically erasable and programmable ROM (EEPROM), mask ROM, flash ROM, a flash memory (e.g., NAND flash or NOR flash), a hard disk drive or a solid state drive (SSD), or any other memory structure known to one of ordinary skill in the art. In the case of a memory detachably mounted to the electronic apparatus 100', the memory may be implemented as a memory card (e.g., a compact flash (CF), secure digital (SD), micro secure digital (micro-SD), mini secure digital (mini-SD), extreme digital (xD), multi-media card (MMC), etc.), an external memory (e.g., a USB memory) connectable to the USB port, or any other type of memory known to one of ordinary skill in the art.

One or more processors 130 may control the operation of the electronic apparatus 100. In one or more examples, the, the one or more processors 130 may be connected to each component of the electronic apparatus 100 to control overall operations of the electronic apparatus 100. For example, the one or more processors 130 may be electrically connected to the display 110 and the memory 120 to control the overall operation of the electronic apparatus 100. The processor 130 may be configured with one or a plurality of processors.

One or more processors 130 may perform an operation of the electronic apparatus 100 according to various embodiments by executing at least one instruction stored in the memory 120.

One or more processors 130 may include one or more of a Central Processing Unit (CPU), a Graphics Processing Unit (GPU), an Accelerated Processing Unit (APU), a Many Integrated Core (MIC), a Digital Signal Processor (DSP), a Neural Processing Unit (NPU), a hardware accelerator, or a machine learning accelerator. One or more processors 130 may control one or any combination of other components of the electronic apparatus and may perform operations or data processing relating to the communication. The one or more processors 130 may execute one or more programs or instructions stored in the memory. For example, one or more processors may perform a method in accordance with one or more embodiments of the disclosure by executing one or more instructions stored in memory.

When a method according to one or more embodiments of the disclosure includes a plurality of operations, a plurality of operations may be performed by one processor or may be performed by a plurality of processors. For example, when a first operation, a second operation, and a third operation are performed by a method according to one or more embodiments, all the first operation, the second operation, and the third operation may be performed by the first processor, the first operation and the second operation may be performed by a first processor (e.g., a general purpose processor), and the third operation may be performed by a second processor (e.g., an artificial intelligence dedicated processor).

The one or more processors 130 may be implemented as a single core processor including one core, or may be implemented as one or more multicore processors including a plurality of cores (e.g., homogeneous multi-cores or heterogeneous multi-cores). When the one or more processors 130 are implemented as a multi-core processor, each of the plurality of cores included in the multi-core processor may include a processor internal memory such as a cache memory and an on-chip memory, and a common cache shared by the plurality of cores may be included in the multi-core processor. In addition, each of a plurality of cores (or a part of a plurality of cores) included in the multi-core processor may independently read and perform a program command for implementing a method according to one or more embodiments of the disclosure, and may read and perform a program command for implementing a method according to one or more embodiments of the disclosure in connection with all, or a part of, a plurality of cores.

When the method according to one or more embodiments of the disclosure includes a plurality of operations, the plurality of operations may be performed by one core among a plurality of cores included in the multi-core processor or may be performed by the plurality of cores. For example, when a first operation, a second operation, and a third operation are performed by a method according to one or more embodiments, both the first operation, the second operation, and the third operation may be performed by a first core included in the multi-core processor, the first operation and the second operation may be performed by a first core included in the multi-core processor, and the third operation may be performed by a second core included in the multi-core processor.

In the embodiments of the disclosure, the processor may be a system-on-chip (SoC) in which one or more processors and other electronic parts are integrated, a single core processor, a multi-core processor, or a core included in a single core processor or a multi-core processor, wherein the core may be implemented as a CPU, a GPU, an APU, an MIC, a DSP, an NPU, a hardware accelerator, or a machine learning accelerator. However, as understood by one of ordinary skill in the art, the embodiments of the disclosure are not limited to these configurations. For convenience of description, one or more processors 130 are referred to as the processor 130.

Figure 2B:
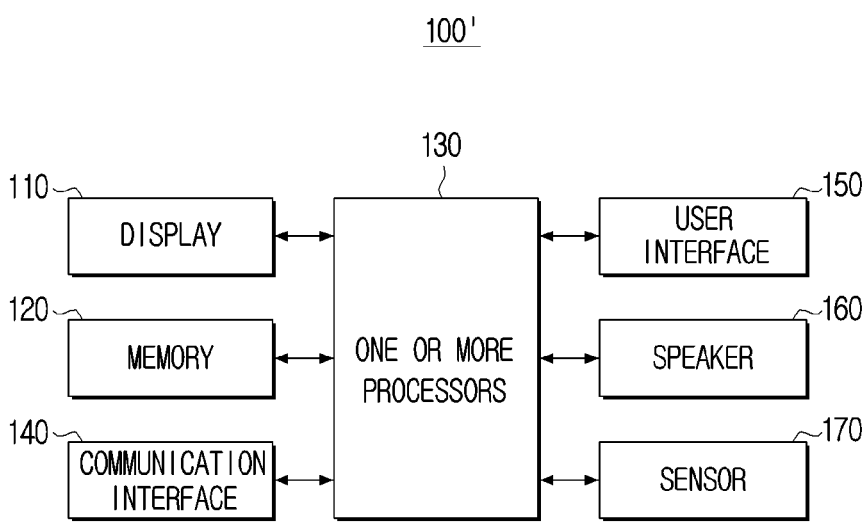
FIG. 2B is a block diagram specifically illustrating a configuration of an electronic apparatus according to one or more embodiments of the disclosure.

FIG. 2B is a block diagram specifically illustrating a configuration of an electronic apparatus according to one or more embodiments of the disclosure.

Referring to FIG. 2B, the electronic apparatus 100' may include the display 110, the memory 120, one or more processors 130, a communication interface 140, a user interface 150, a speaker 160, and a sensor 170. Among the configurations of FIG. 2B, those overlapping with FIG. 2A will not be further described.

The communication interface 140 may be implemented with various interfaces according to one or more embodiments of the electronic apparatus 100'. For example, the communication interface 140 may communicate with an external device, an external storage medium (e.g., a universal serial bus (USB) memory), an external server (e.g., a web hard) through communication methods such as, for example, and without limitation, Bluetooth, an access point (AP)-based Wi-Fi (wireless LAN network), Zigbee, wired/wireless local area network (LAN), wide area network (WAN), Ethernet, IEEE 1394, high definition multimedia interface (HDMI), universal serial bus (USB), mobile high-definition link (MHL), advanced encryption standard (AES)/European broadcasting union (EBU), optical, coaxial, or any other communication method known to one of ordinary skill in the art. According to one or more embodiments, the communication interface 140 may communicate with a remote control device and/or a user terminal having a remote control function.

The user interface 150 may be implemented with a device like such as a button, a touch pad, a mouse, and a keyboard, or a touch screen capable of a display function and an operation input function together.

The speaker 160 may output not only various audio data, but also various notification sounds or a voice message. The processor 130 may control a speaker to output information corresponding to the UI screen or various notification in a format of audio.

The sensor 170 may include various types of sensors such as a touch sensor, a proximity sensor, an acceleration sensor, a geomagnetic sensor, a gyro sensor, a pressure sensor, a position sensor, an illuminance sensor, or any other suitable sensor known to one of ordinary skill in the art.

According to one or more embodiments, the electronic apparatus 100' may include a camera, a microphone, a tuner, and a demodulator, or any other suitable component known to one of ordinary skill in the art.

A camera may perform capturing by being turned on according to a predetermined event. The camera may convert the captured image into an electrical signal and generate image data based on the converted signal. For example, a subject may be converted into an electrical image signal through a charge coupled device (CCD) sensor, and the converted image signal may be converted into an amplified signal and a digital signal and subsequently processed.

A microphone may be configured to receive a user voice or other sound and convert the user voice or other sound into audio data. According to one or more embodiments, the electronic apparatus 100' may receive a user voice inputted through an external device through the communication interface 140.

A tuner may receive a radio frequency (RF) broadcast signal by tuning a channel selected by a user or all pre-stored channels among RF broadcast signals received through an antenna.

A demodulator may receive and demodulate the digital intermediate frequency (IF) signal and digital IF (DIF) signal converted by the tuner, and perform channel decoding, or any other demodulator function known to one of ordinary skill in the art.

According to one or more embodiments, the processor 130 may provide a UI screen including GUI items having various sizes and/or various ratios. In one or more examples, the GUI item may include various types of images and/or texts corresponding to various types of content such as image content, video content, applications, advertisement content, or any other suitable content. For example, the GUI item may be a thumbnail, a representative image, a title, a description, etc. representing the corresponding content, but may include an image and/or text capable of identifying the corresponding content.

According to one or more embodiments, the processor 130 may group and display GUI items. In one or more examples, the term "grouping" may mean that GUI items included in one group are displayed in different regions so as to be distinguished from GUI items included in another group. In addition, the processor 130 may display a title of each group on at least one of the upper end or the lower end of each group. According to one or more embodiments, the processor 130 may display a group title in a left alignment on the upper end of each group, but is not necessarily limited thereto. For example, it is possible to display a left alignment at a lower end of each group or to display a right alignment on the upper end of each group.

According to one or more embodiments, a plurality of groups may be displayed on one list. For example, GUI items included in each of the plurality of groups may be moved in one direction in conjunction with the scroll input. In one or more examples, the scroll correspond to the information displayed on the screen moving up and moving down or left and right, and if the amount of information displayed on the screen exceeds one screen size, the entire information displayed on the screen may move up and down or left and right. The scroll input may include various user commands for generating a scroll.

Figure 3:
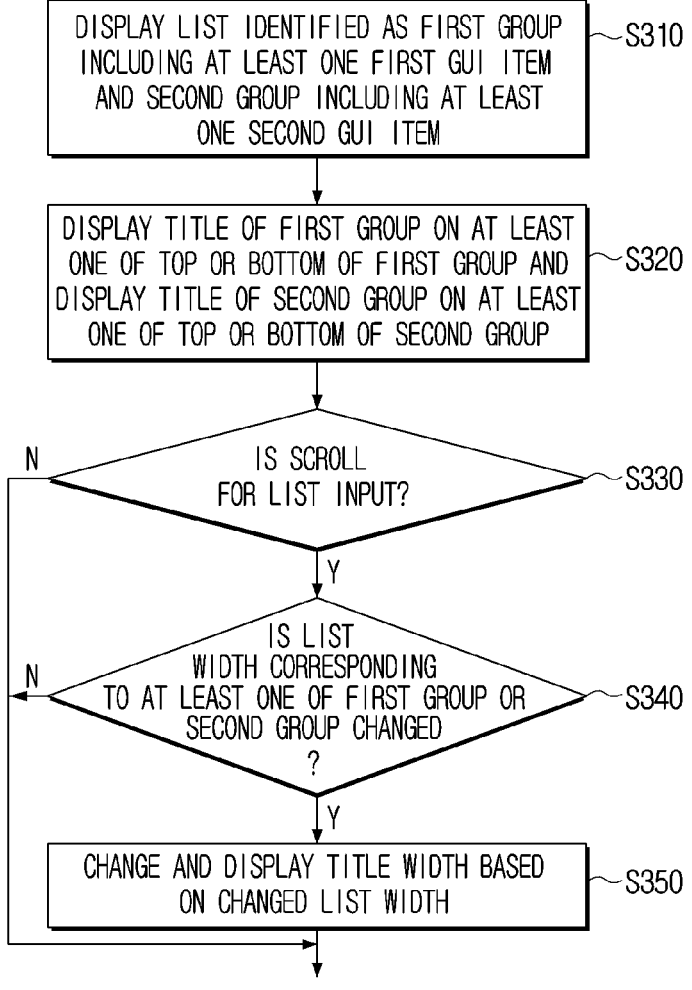
FIG. 3 is a flowchart illustrating a method of providing a user interface (UI) according to one or more embodiments of the disclosure.

FIG. 3 is a flowchart illustrating a method of providing a user interface (UI) according to one or more embodiments of the disclosure.

According to one or more embodiments illustrated in FIG. 3, the processor 130 may control the display 110 to display a list identified or determined as a first group including at least one first GUI item and a second group including at least one second GUI item in operation S310. In addition, the processor 130 may display the title of the first group on at least one of the top or bottom of a display of the first group items and display the title of the second group on at least one of the top or bottom of a display of the second group items in operation S320. Although operations S310 and S320 are individually described for convenience of description, a GUI item and a group title of each group may be simultaneously displayed. For example, as shown in FIG. 1, the list 10 including GUI items corresponding to a group of "Accessories & Music" and GUI items corresponding to the group "Apps & Devices", and in which titles of each group are aligned on a top left of the group, may be displayed.

When the scroll input for the list is identified in operation S330:Y, the processor 130 may identify whether the list width corresponding to at least one of the first group or the second group is changed in operation S340.

According to one or more embodiments, the processor 130 may identify or determine whether an amount of change of a list width corresponding to at least one of the first group or the second group is greater than or equal to a threshold width. In one or more examples, the threshold width may be set differently according to a list width corresponding to each group. For example, the threshold width may be determined differently according to a list width corresponding to each group displayed on the current screen. In one or more examples, the processor 130 may identify whether a difference between the title width of the first group (or the title width of the second group) and the list width of the first group (or the list width of the second group) is within a threshold width range. For example, the threshold width range may be a preset value, and the range may be determined to a value in which the width (or title width of the second group) of the first group and the changed list width of the first group (or the list width of the second group) are similar to each other.

If it is identified or determined that the list width corresponding to at least one of the first group or the second group is changed in operation S340:Y, the processor 130 may control the display 110 to change and display the title width of at least one of the first group or the second group based on the changed list width in operation S350. According to one or more embodiments, when a change value of a list width corresponding to at least one of a first group or a second group is greater than or equal to a threshold width, the processor 130 may control the display 110 to change and display a title width of at least one of the first group or the second group. In one or more examples, if the difference between the title width of the first group (or the title width of the second group) and the list width of the first group (or the list width of the second group) is within the threshold width range, the processor 130 may control the display 110 to change and display the title width of at least one of the first group or the second group.

According to one or more embodiments, when the list width corresponding to the first group becomes shorter to be less than the title width of the first group according to left direction scroll input, the processor 130 may control the display 110 to change and display the title width of the first group. In addition, the processor 130 may control the display 110 to change and display the title width of the second group when the list width corresponding to the second group becomes shorter than the title width of the second group according to the right direction scroll input.

Figure 4:
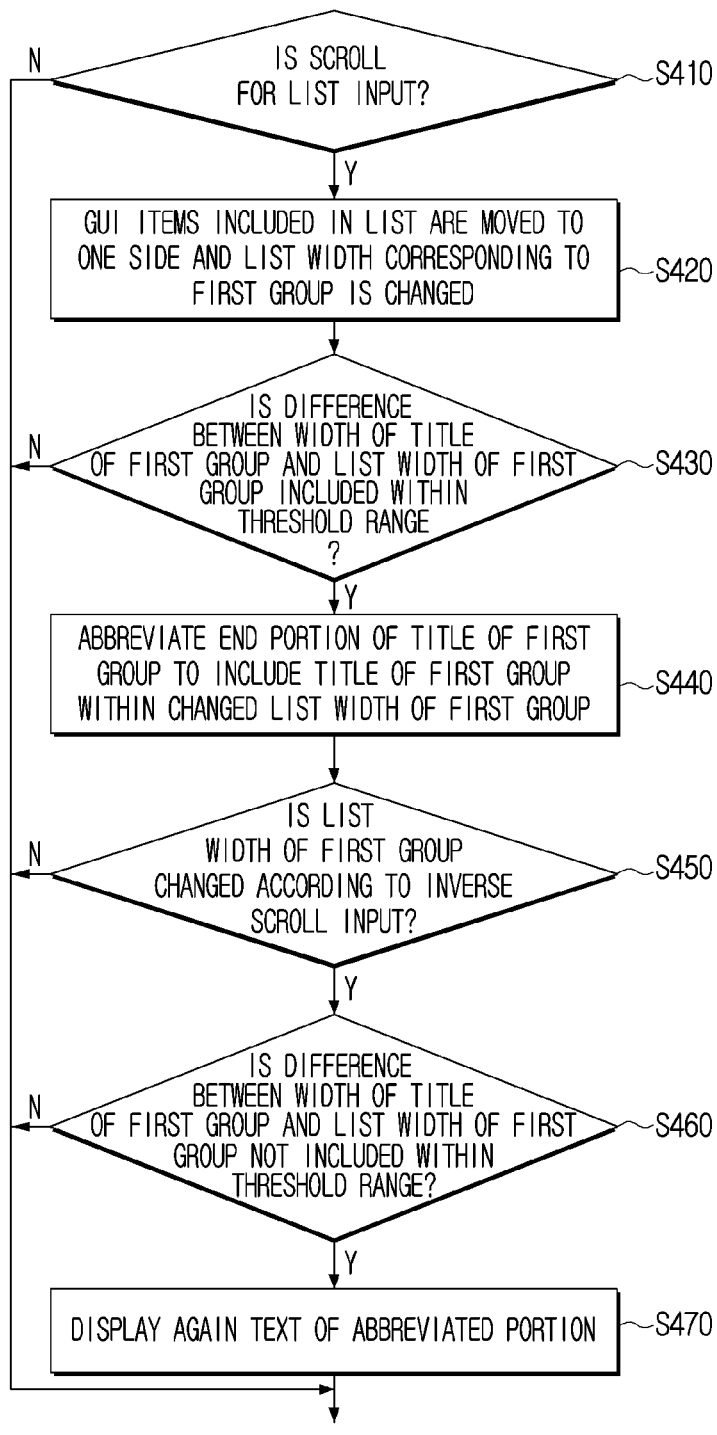
FIG. 4 is a flowchart illustrating a method of providing a UI screen of FIG. 3 according to one or more embodiments.

FIG. 4 is a flowchart illustrating a method of providing a UI screen of FIG. 3 according to one or more embodiments.

In FIG. 4, according to a scroll input with respect to a list in operation S410:Y, GUI items included in the list may be moved vertically or horizontally to one side and the list width corresponding to the first group may be changed in operation S420.

In this case, the processor 130 may identify or determine whether a difference between the width of the title of the first group and the changed list width of the first group is within a threshold width range in operation S430. In one or more examples, the threshold width range may be a preset value, and may be determined to a value in which the width of the first group of titles and the changed list width of the first group are similar to each other. For example, the processor 130 may identify whether a difference between the width of the title of the first group and the changed list width of the first group is similar to each other with a slight margin.

When it is identified or determined that the difference between the width of the title of the first group and the changed list width of the first group is included within the threshold width range in operation S430:Y, the processor 130 may abbreviate (or omit) an end portion of the title of the first group in operation S440. For example, the processor 130 may abbreviate the end portion of the title of the first group to include the title of the first group within the changed list width of the first group. In one or more examples, the abbreviation may include processing using an ellipsis like " . . . ", but is not limited thereto, and any mark that indicates that the remaining portion is abbreviated (or omitted) may be used without limitation. For example, referring to FIG. 1, the title of the group "Accessories & Music" may be abbreviated to "Accessories & Mu . . . ".

After the end portion of the title of the first group is abbreviated, the processor 130 may identify or determine whether the list width of the first group is changed according to inverse scroll input in operation S450.

The processor 130 may, based on identifying or determining that the list width of the first group is changed according to an inverse scroll input and a difference between the width of the title of the first group and the changed list width is included within the threshold width range in operation S460:Y, repeat the display of a text of the abbreviated portion in operation S470. For example, the processor 130 may display the text corresponding to the abbreviation-processed portion again when the list width of the first group is lengthened enough to display the end portion text of the title of the first group according to the inverse scroll input.

However, as understood by one of ordinary skill in the art, the embodiments are not limited to these configurations, and according to one or more examples, the processor 130 may abbreviate the appropriate text portion based on the text type of the group title when the group title abbreviation is required. For example, if the group title is of a type including one word (e.g., sponsored), or a type including a plurality of consecutive words (e.g., recently played), the end portion of the title may be abbreviated. In one or more examples, when a group title is a type in which a plurality of words are combined by & and a width of a title word disposed on the front side is relatively long, a title word disposed at the front side may be abbreviated. Accordingly, even if the group title is abbreviated, at least a portion of each of the plurality of words may be recognized.

According to one or more examples, when a group title change process is necessary, the processor 130 may replace a group title with a summarized text and display the same. For example, the group title may be replaced with a summarized word rather than abbreviation such as . . . . For example, if the group text is abc def ghi, the text may be replaced with a summarized text such as ADG or may be replaced with a summarized text such as abc. However, this is merely exemplary, and a summarized text may have various types according to types of titles. For example, in case of the title Recently Played, a summarized text that is recognizable by a user such as "Recently P", or "Recently" may be used to replace the original title.

According to one or more examples, the processor 130 may identify or determine whether to abbreviate the appropriate text portion or replace the summarized text based on the text type of the group title when the group title change processing is necessary. For example, a group title may be abbreviated or replaced with a summarized text based on the recognition degree of a user according to an abbreviation processing or a summary processing. The recognition degree may correspond to a likelihood that an abbreviated version of a title is recognized.

According to one or more embodiments, the scroll input may be input in various forms according to the implementation form of the electronic apparatus 100, such as a pressing operation (e.g., a long press input), a touch scroll operation, a scroll button operation, a serial key input in a wheel input device, and the like, for a specific button provided in a preset navigation input, for example, a remote control device. In addition, the scroll control method of the list may include various types such as a movable focus method, a fixed focus method, a cursor (or a pointer) moving method, or any other suitable scroll control. Hereinafter, a method for providing a UI corresponding to various types of scroll control methods will be described with reference to the drawings.

Figure 5:
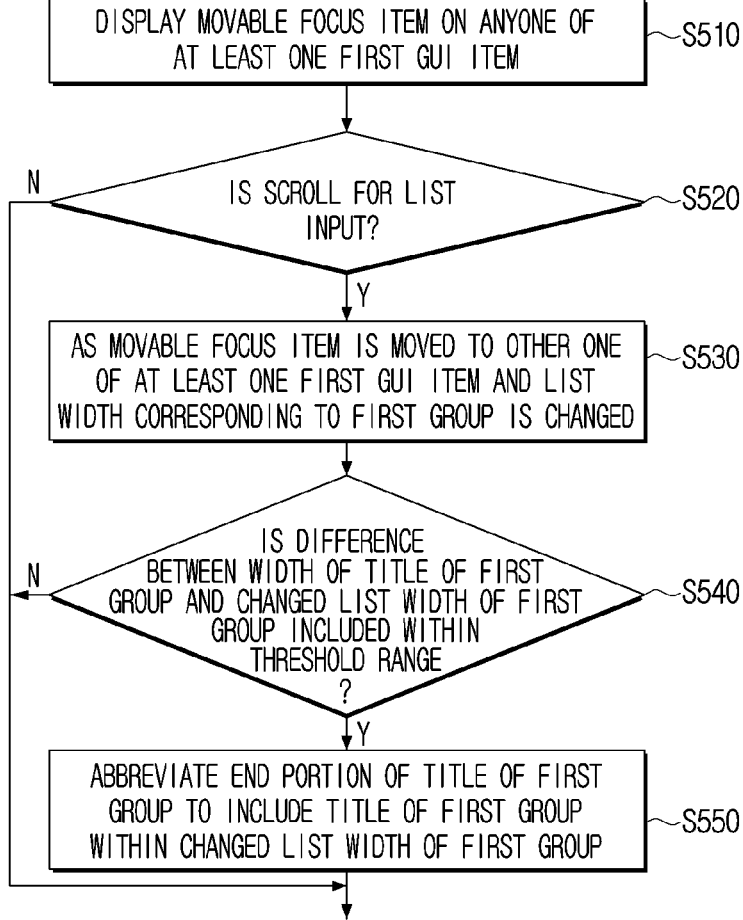

FIGS. 5 and 6 are diagrams illustrating a method of providing a UI screen according to a movable focusing method according to one or more embodiments of the disclosure.

According to one or more embodiments illustrated in FIG. 5, the processor 130 may control the display 110 to display a movable focus item on one of at least one first GUI item included in a first group in operation S510. The movable focus item may be an item for controlling the scroll of the list according to a movable focus method, and the movable focus item may be moved in one direction according to the scroll input, and the GUI items included in the list may be moved in the opposite direction.

According to one or more embodiments, the GUI item may be arranged in a specific direction such as a horizontal direction, a vertical direction, a diagonal direction, or any other suitable direction, and may be a specific shape (e.g., a rectangle, a round rectangle, a circle, a diamond, etc.). According to one or more embodiments, the focus item may be highlighted in an edge of the GUI item, but is not necessarily limited thereto, and may be highlighted in the entire GUI item or in some edges.

When the scroll input with respect to the list is identified in operation S520:Y, the list width corresponding to the first group may be changed by moving the movable focus item to one of the at least one first GUI item included in the first group or at least one second GUI item included in the second group in operation S530.

In this example, the processor 130 may identify whether the difference between the title width of the first group and the changed list width is included within the threshold width in operation S540.

When it is identified or determined that the difference between the width of the title of the first group and the changed list width of the first group is included within the threshold width range in operation S540:Y, the processor 130 may abbreviate or omit the end portion of the title of the first group in operation S550.

According to one or more embodiments, the processor 130 may display a UI screen 600 as shown in the upper side of FIG. 6. The UI screen 600 may include various menu items 601, 602, 603, 604, 605 and a plurality of GUI item lists 610, 620, 630, 640. The GUI items 631, 632, 633 included in the first group (Accessories & Music group), and the GUI items 634, 635, 636, 637, 638 included in the second group (Apps & Devices group) may be provided on one list 630. According to one or more embodiments, the first group may be displayed on a left area in the list 630, and the second group (Apps & Devices group) may be displayed on a right area in the list 630. A list may correspond to items in a same row, column or tile in a display. In addition, the title of the first group, that is, "Accessories & Music" may be displayed in a left alignment on the upper end of the first group and the title of the second group, that is, "Apps & Devices" may be displayed as a left alignment on the upper end of the second group. In addition, a movable focus item 20 may be displayed on any one of the GUI items 633 included in the first group (Accessories & Music group).

According to the scroll input, according to one or more embodiments, the location of the movable focus item 20 may be moved to the GUI item 634 included in the second group (Apps & Devices group), and GUI items included in the list 630 may be moved in the left or right direction. In this case, the GUI item 631 located at the foremost of the list 630 may disappear on the screen, so that the list width corresponding to the first group (Accessories & Music group) is shortened, while a new GUI item 639 is displayed, resulting in the list width corresponding to the second group (Apps & Devices group) being lengthened.

In this case, the processor 130 may abbreviate the title of the first group. For example, the end portion of the "Accessories & Music" may be abbreviated as "Accessories . . . ". Accordingly, the display of the title of the first group does not collide with the title of the second group (e.g., Apps & Devices). For example, the title of the first group may be prevented from overlapping with the title of the second group.

Figure 7:
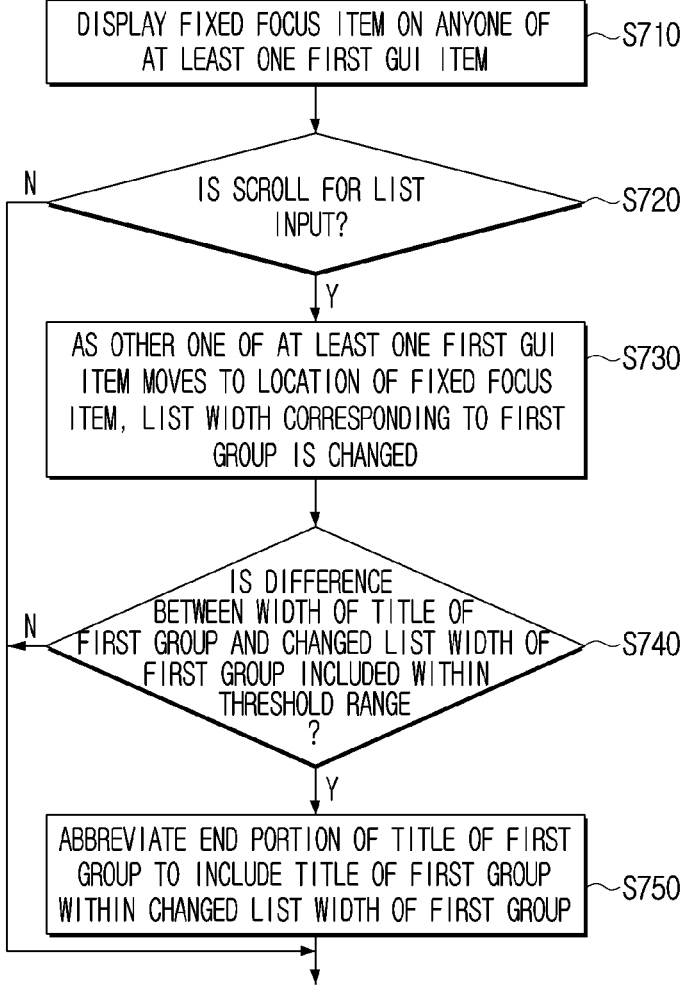

FIGS. 7 and 8 are diagrams illustrating a method of providing a UI screen according to a fixed focusing method according to one or more embodiments of the disclosure.

According to one or more embodiments illustrated in FIG. 7, the processor 130 may control the display 110 to display a fixed focus item in one of at least one first GUI item included in the first group. The fixed focus item may be an item for controlling the scroll of the list according to the fixed focus method. The location of the fixed focus item may be fixed according to the scroll input, the GUI items included in the list are moved in the scroll direction, and a new GUI item not provided on the UI screen may be provided to the UI screen.

When a scroll input for the list is identified or determined in operation S720:Y, one of the first GUI items included in the first group may be moved to the location of the fixed focus item so that the list width corresponding to the first group may be changed in operation S730.

In this example, the processor 130 may identify or determine whether the difference between the title width of the first group and the changed list width is included in the threshold width range in operation S740.

When it is identified or determined that the difference between the width of the title of the first group and the changed list width of the first group is included within the threshold width range in operation S740:Y, the end portion of the title of the first group may be abbreviated (or omitted) in operation S750.

According to one or more embodiments, the processor 130 may display a UI screen 600 as shown in the upper side of FIG. 8. The configuration of the UI screen displayed on the upper side of FIG. 8 is similar to the configuration of the UI screen displayed on the upper side of FIG. 6. Therefore, a duplicate description will be omitted. Unlike FIG. 6, in FIG. 8, a fixed focus item 30 may be located on the GUI item 631 located at the front of the list 630 including GUI items 631, 632, 633 of the first group and GUI items 634, 635, 636, 637, and 638 of the second group.

According to one or more embodiments of the disclosure, the GUI items included in the list 630 may be moved in a left direction or right direction while another GUI item 632 belonging to the first group (Accessories & Music group) is moved to a location of the fixed focus item 30 according to a scroll input, according to one or more embodiments. In this case, a GUI item 631 located at the foremost of the list 630 may disappear from the screen so that a list width corresponding to the first group is shortened, whereas a new GUI item 639 is displayed so that a list width corresponding to the second group (Apps & Devices group) is lengthened. Accordingly, the title corresponding to the first group (Accessories & Music group), that is, the width or length of the title "Accessories & Music" may be shortened to less than a changed list width of the first group.

In this case, the processor 130 may abbreviate the title of the first group, for examples, the end part of "Accessories & Music" to "Accessories . . . " Accordingly, the title of the first group is not displayed by being collided with the title of the second group (that is, Apps & Devices). For example, the title of the first group may be prevented from overlapping with the title of the second group and displayed.

Figure 9:
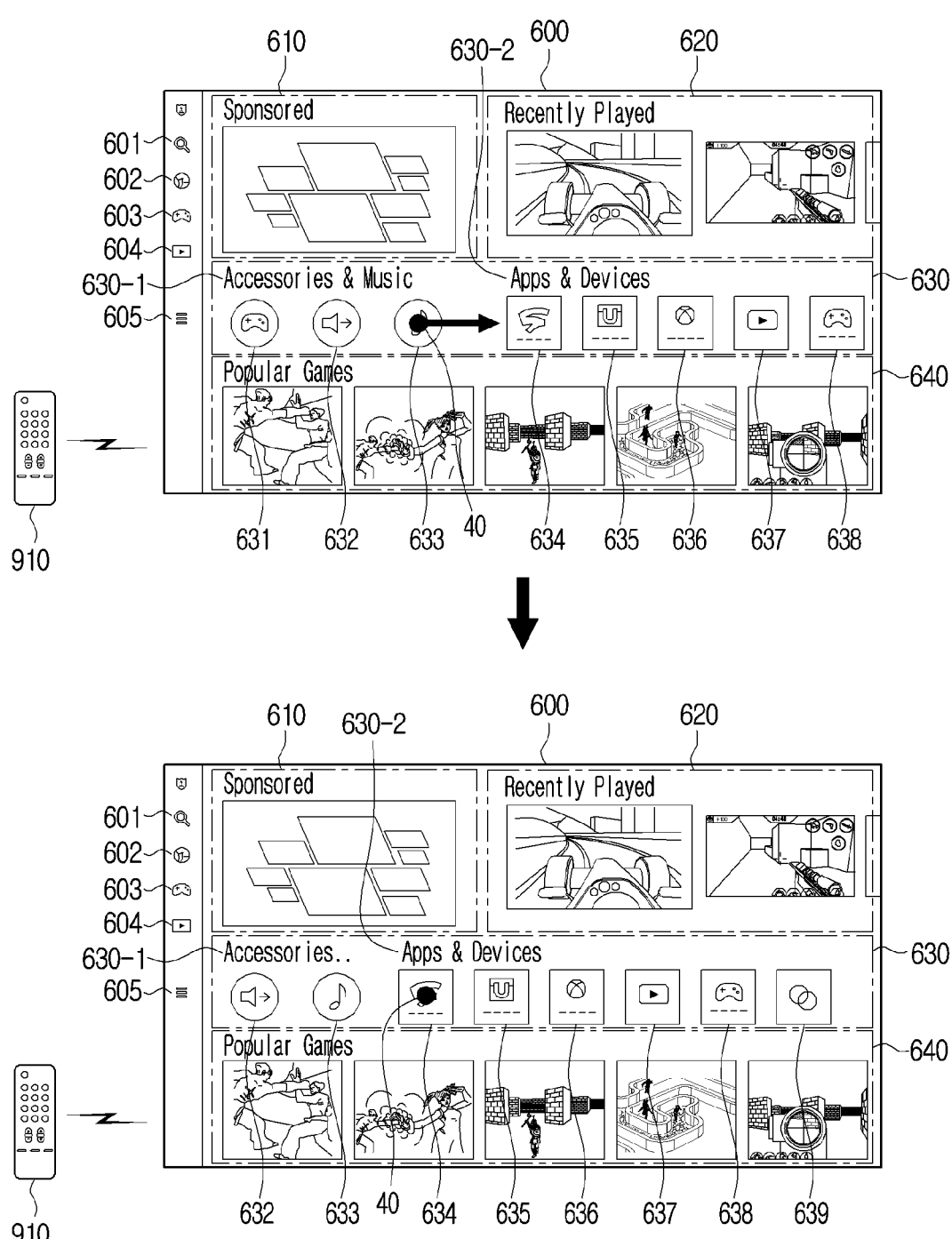
FIG. 9 is a diagram illustrating a method of providing a UI screen according to a cursor moving according to one or more embodiments of the disclosure.

FIG. 9 is a diagram illustrating a method of providing a UI screen according to cursor movement according to one or more embodiments of the disclosure.

According to one or more embodiments shown in FIG. 9, the processor 130 may provide a cursor item 40 on the UI 600. In one or more examples, the cursor item 40 may be controlled by a remote control device 910 as illustrated in FIG. 9. However, the control of the cursor item is not limited to these configurations. The control function of the cursor item 40 may be implemented in various forms, but for convenience of description, the moving direction of the cursor item 40 and the moving direction of the list are assumed to be opposite directions. For example, when the cursor item 40 moves in the right direction, the list moves in the left direction.

According to one or more examples, as shown in FIG. 9, the GUI items included in the list 630 may be moved in the left direction while the curser item 40 moves in the right direction to the GUI item 634 included in the second group (Apps & Devices group) while the curser item 40 is being located on the GUI item 633 included in the first group (Accessories & Music group). In this case, the GUI item 631 located at the foremost left side of the list 630 (e.g., beginning of the list) disappears on the screen, so that the list width corresponding to the first group (Accessories & Music group) is shortened, while a new GUI item 639 is displayed. As a result, the list width corresponding to the second group (Apps & Devices group) is lengthened.

In this case, the processor 130 may abbreviate the end portion of the title of the first group. For example, "Accessories & Music" is abbreviated to "Accessories . . . ".

Accordingly, the title of the first group does not collide with the title of the second group (e.g., Apps & Devices). For example, the title of the first group may be prevented from overlapping with the title of the second group.

FIG. 10 is a diagram illustrating a method of providing a UI screen according to a touch method according to one or more embodiments of the disclosure.

According to one or more embodiments of FIG. 10, the UI screen 600 may be provided on the display screen on which touch input is possible. For example, the UI screen 600 may be provided on a display screen of a tablet or any other device having a touch screen.

According to one or more examples shown in FIG. 10, when a touch scroll input in a left direction is identified while a user's hand is located on the GUI item 633 included in the first group (Accessories & Music group), GUI items included in the list 630 may be moved in a left direction. In this case, the GUI item 631 located at the front of the list 630 disappears on the screen, so that the list width corresponding to the first group (Accessories & Music group) is shortened, while a new GUI 639 is displayed. As a result, the list width corresponding to the second group (Accessories & Music group) is lengthened.

In this case, the processor 130 may abbreviate the end portion of the title of the first group such that the title "Accessories & Music" is abbreviated to "Accessories . . . ". Accordingly, the title of the first group is displayed without overlapping with the title of the second group (e.g., Apps & Devices). For example, the embodiments of the present disclosure advantageously prevent the title of the first group overlapping with the title of the second group.

FIG. 11 is a diagram illustrating a method of providing a UI screen according to inverse scroll input according to one or more embodiments of the disclosure.

The upper drawing of FIG. 11 may be the same as the lower drawing of FIG. 6. For example, the upper drawing of FIG. 11 may be a state in which the GUI items included in the list 630 are moved in the left direction while the location of the movable focus item 20 is moved to the GUI item 634 included in the second group (Accessories & Music group) according to the scroll input. Accordingly, the title of the first group, for example, the end portion of "Accessories & Music," may be abbreviated to "Accessories . . . ".

In this case, the processor 130 may move the GUI items included in the list 630 in the right direction while the location of the movable focus item 20 is moved from the GUI item 634 included in the second group (Apps & Devices group) to the GUI item 633 included in the first group (Accessories & Music group) according to inverse scroll input in a direction opposite to the previous scroll direction. In this case, while a GUI item 631 located at the front of the list 630 is displayed again on the screen, a list width corresponding to the first group (Accessories & Music group) is lengthened, while a GUI item 639 disappears from the screen, so that the list width corresponding to the second group (Apps & Devices group) is shortened.

In this case, the processor 130 may restore the first group of titles which have been abbreviated to an original state. For example, the text corresponding to the abbreviated portion in the title of the first group, which has been displayed as "Accessories . . . " may be displayed again to be displayed as "Accessories & Music".

FIG. 12 is a diagram illustrating a method of providing a UI screen according to a scroll input according to one or more embodiments of the disclosure.

FIG. 12 is a diagram illustrating another example of title abbreviation. In the embodiment above, it has been derived that the end portion is abbreviated if the group title abbreviation is necessary, but the embodiment is not necessarily limited thereto.

According to one or more embodiments, in a scroll situation shown in FIG. 12, a middle portion of the title other than an end portion may be abbreviated when a title abbreviation of the first group ("Accessories & Music" group) is required. For example, the title of the first group is "Accessories & Music" may be abbreviated to "Acce . . . & Music".

The processor 130 may abbreviate the appropriate text portion based on the text type of the group title when the group title abbreviation is required in the scroll situation. For example, as a group title is a type in which a plurality of words are combined by &, and when the width of a title word arranged in front is longer than a word threshold, a title word arranged on the front side may be abbreviated. Accordingly, even if the group title is abbreviated, at least a portion of each of the plurality of words may be recognized.

FIG. 13 is a diagram illustrating a method of providing a UI screen according to a scroll input according to one or more embodiments of the disclosure.

FIG. 13 is a diagram illustrating another example of a group title change process. According to one or more embodiments, when group title change processing is necessary, it has been described that an ellipsis such as " . . . " is used. However, as understood by one of ordinary skill in the art, the embodiments are not limited to these configurations.

The processor 130 may replace the group title with a summarized text when group title change process is necessary.

According to one or more embodiments, if title changing of the first group ("Accessories & Music" group) is necessary under scroll of FIG. 13, the group title may be replaced with the summarized title and displayed.

For example, if the group title changing is necessary under the scroll, the group title may be replaced with a summarized word instead of an abbreviation such as " . . . ". For example, the title of the first group "Accessories & Music" may be replaced with the summarized text such as "Acce & Music" and displayed.

FIGS. 14, 15A, and 15B are diagrams illustrating one or more examples of a UI screen providing method according to one or more embodiments of the disclosure.

According to FIG. 14, when a list control is generated in operation S1405, the processor 130 may compare a group list width and a group title width in operation S1410.

The processor 130 may identify whether the width of the group title is similar to the width of the group list or the width of the group title is shorter than the width of the group list in operation S1415. Here, that the width of the group title is similar to the width of the group list may mean that the width difference is included in the threshold width range.

The processor 130 may identify whether the group title width is similar to the group list width or the group title width is shorter than the group list width in operation S1415. Here, it may mean that the width difference is included within a threshold width range that the group title width is similar to the group list width.

If the width of the group title is similar to the width of the group list, the processor 130 may abbreviate the end of the group title at the same time as the list scroll starts in operation S1420. For example, FIG. 15A illustrates one or more examples where a first group including first GUI items 1511, 1512 and a second group including second GUI items 1521, 1522 are included in one list, and the title width of the first group is similar to the list width of the first group. In this case, the processor 130 may abbreviate the end of the first group title at the same time as the list scroll starts.

If the group title width is shorter than the group list width, the processor 130 may maintain the group title even when the list movement starts, and may abbreviate the end of the group title from the moment when the group title width becomes similar to or less than the group list width in operation S1425. For example, FIG. 15B illustrates one or more examples in which a first group including first GUI items 1511, 1512 and a second group including second GUI items 1521, 1522 are included in one list and the title width of the first group is shorter than the list width of the first group. In this case, the processor 130 may maintain the first group title even when the list movement starts, and may abbreviate the end of the first group title from the moment when the first group title width becomes similar to or less than the first group list width.

The processor 130 may, when the width of the group title is longer than the width of the group list, abbreviate the group title before start of the scroll in operation S1430.

The processor 130 may change the width of the group title as well when changing the width of the group list by scroll through the above processing in operation S1435.

In addition, the processor 130 may identify or determine whether the group list is scrolled and be out of the screen, which is, placed out of the screen in operation S1440.

The processor 130 my hide the group title from the screen in operation S1445, when it is identified or determined that the group list is scrolled and disappears from the screen in operation S1440:Y. For example, the processor 130 may allow the group title to disappear from the screen.

In one or more examples, when it is identified that at least a portion of the group list is maintained within a screen in operation S1440:N, the processor 130 may maintain at least a portion of the group title within a screen.

In the meantime, after hiding the group title from the screen, when it is or determined that at least a part of the group list which disappears from the screen is again entered into the screen in operation S1445:Y, at least a part of the group title may be displayed again in operation S1460.

According to various embodiments described above, in a situation in which a plurality of groups of GUI items are provided in one list, a list width corresponding to any one group from among a plurality of groups is shorter than a group title, thereby preventing a phenomenon in which a plurality of groups of titles collide with each other and displayed. Accordingly, the UX experience of the user with respect to the UI screen may be improved.

The methods according to various embodiments of the disclosure described above may be implemented in the form of an application that may be installed in an existing electronic apparatus. Alternatively, at least some of the methods according to various embodiments of the disclosure described above may be performed using a deep learning-based artificial intelligence model (deep neural network), that is, a learning network model.

The methods according to the various embodiments as described above may be implemented as software upgrade or hardware upgrade for an existing electronic apparatus.

The various embodiments described above may be performed through an embedded server provided in an electronic apparatus, or an external server of at least one electronic apparatus and a display device.

Various embodiments may be implemented in software, including instructions stored on machine-readable storage media readable by a machine (e.g., a computer). An apparatus may call instructions from the storage medium, and execute the called instruction, including an electronic apparatus (for example, an electronic apparatus A) according to the disclosed embodiments. When the instructions are executed by a processor, the processor may perform a function corresponding to the instructions directly or by using other components under the control of the processor. The instructions may include a code generated by a compiler or a code executable by an interpreter. A machine-readable storage medium may be provided in the form of a non-transitory storage medium. Herein, the term "non-transitory" only denotes that a storage medium is tangible, and does not distinguish the case in which a data is semi-permanently stored in a storage medium from the case in which a data is temporarily stored in a storage medium.

According to one or more embodiments, the method according to the above-described embodiments may be included in a computer program product. The computer program product may be traded as a product between a seller and a consumer. The computer program product may be distributed online in the form of machine-readable storage media (e.g., compact disc read only memory (CD-ROM)) or through an application store (e.g., PLAYSTORE™, APP-STORE™) or distributed online directly. In the case of online distribution, at least a portion of the computer program product may be at least temporarily stored or temporarily generated in a server of the manufacturer, a server of the application store, or a machine-readable storage medium such as memory of a relay server.

According to embodiments, the elements (e.g., module or program) described above may include a single entity or a plurality of entities. According to embodiments, at least one element or operation from among the corresponding elements described above may be omitted, or at least one other element or operation may be added. Alternatively or additionally, a plurality of components (e.g., module or program) may be combined to form a single entity. In this case, the integrated entity may perform functions of at least one function of an element of each of the plurality of elements in the same manner as or in a similar manner to that performed by the corresponding element from among the plurality of elements before integration. The module, a program module, or operations executed by other elements according to variety of embodiments may be executed consecutively, in parallel, repeatedly, or heuristically, or at least some operations may be executed according to a different order, may be omitted, or the other operation may be added thereto.

While one or more embodiments of the disclosure have been shown and described, the disclosure is not limited to the aforementioned specific embodiments, and it is apparent that various modifications may be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

What is claimed is:

1. An electronic apparatus comprising:
a display;
a memory configured to store one or more instructions; and
one or more processors connected to the display and the memory and configured to control the electronic apparatus, wherein the one or more instructions, when executed by the one or more processors individually or collectively, cause the electronic apparatus to:
display a list comprising (i) a first group that includes one or more first graphic user interface (GUI) items and (ii) a second group that includes one or more second GUI items,
display a title of the first group on at least one of an upper end or a lower end of a display of the one or more first GUI items on the display,
display a title of the second group on at least one of an upper end or a lower end of a display of the one or more second GUI items on the display,
based on a displayed list width corresponding to the first group being changed according to a scroll input with respect to the second group, display a modified title of the first group by changing a displayed title width of the first group on the display,
control the display to display a movable focus item on one of the one or more first GUI items, and
based on the displayed list width corresponding to the first group being changed as the movable focus item is moved to another one of the one or more first GUI items or one of the one or more second GUI items according to the scroll input, control the display to display the modified title of the first group based on the changed displayed list width,
wherein the one of the one or more first GUI items and the one or more second GUI items are aligned in a same direction as a scrolling direction corresponding to the scroll input,
wherein the instructions, when executed by the one or more processors individually or collectively, cause the electronic apparatus to, in response to the scroll input and based on a number of GUI items included in the first group displayed on the display being reduced and the displayed list width corresponding to the first group being shorter than the displayed title width of the first group, display the modified title of the first group based on a difference between the displayed title width of the first group and the displayed list width corresponding to the first group,
wherein the displayed portion of the modified title is displayed in a same position before and after the scroll, and
wherein the modified title is an abbreviation of the title of the first group or the title of the second group in a direction corresponding to the scrolling direction.

2. The electronic apparatus of claim 1, wherein the instructions, when executed by the one or more processors individually or collectively, cause the electronic apparatus to, based on the displayed list width corresponding to the first group being changed according to the scroll input with respect to the list, control the display to change the displayed title width of the first group such that the title of the first group is displayed within the changed displayed list width.

3. The electronic apparatus of claim 2, wherein the instructions, when executed by the one or more processors individually or collectively, cause the electronic apparatus to, based on determining that the one or more first GUI items or the one or more second GUI items included in the list are moved to one side, determining that the displayed list width corresponding to the first group is changed, and determining that a difference between the displayed title width of the first group and the changed displayed list width is within a threshold width range, abbreviate an end portion of the title of the first group to include the title of the first group within the changed displayed list width of the first group.

4. The electronic apparatus of claim 3, wherein the instructions, when executed by the one or more processors individually or collectively, cause the electronic apparatus to, based on determining that the displayed list width of the first group is changed according to a reverse scroll input and determining that the difference between the displayed title width of the first group and the changed displayed list width is within the threshold width range, control the display to repeat a display of a text of the abbreviated end portion.

5. The electronic apparatus of claim 1, wherein the instructions, when executed by the one or more processors individually or collectively, cause the electronic apparatus to:
  control the display to display a fixed focus item on one of the one or more first GUI items, and
  based on the displayed list width corresponding to the first group being changed according to the scroll input, and based on another one of the one or more first GUI items is moved to a location of the fixed focus item, control the display to display the modified title of the first group based on the changed displayed list width.

6. The electronic apparatus of claim 1, wherein the instructions, when executed by the one or more processors individually or collectively, cause the electronic apparatus to:
  control the display to display a cursor item, and
  based on the displayed list width corresponding to the first group being changed according to the scroll input while a pointer item is located on one of the one or more first GUI items, control the display to display the modified title of the first group based on the changed displayed list width.

7. The electronic apparatus of claim 1, wherein the instructions, when executed by the one or more processors individually or collectively, cause the electronic apparatus to, based on the displayed list width corresponding to the first group being changed according to the scroll input with respect to the list, control the display to display the title of the first group by abbreviation based on the changed displayed list width or the title type of the first group or replace and display the title of the first group with a summarized title.

8. The electronic apparatus of claim 1, wherein the instructions, when executed by the one or more processors individually or collectively, cause the electronic apparatus to:
  based on the displayed list width corresponding to the first group being shortened to less than a title length of the first group based on a scroll input in a left direction, control the display to abbreviate and display at least one of a plurality of words included in the title of the first group, and
  based on a displayed list width corresponding to the second group being shortened to less than a title length of the second group based on a scroll input in a right direction, control the display to abbreviate and display at least one of a plurality of words included in the title of the second group.

9. The electronic apparatus of claim 1, wherein the instructions, when executed by the one or more processors individually or collectively, cause the electronic apparatus to:
  based on the displayed list width corresponding to the first group being shortened to less than a title length of the first group based on a scroll input in a left direction, control the display to replace and display the title of the first group with a summarized title, and
  based on a displayed list width corresponding to the second group being shortened to less than a title length of the second group based on a scroll input in a right direction, control the display to replace and display the title of the second group with a summarized title.

10. A method of providing a user interface (UI) of an electronic apparatus, the method comprising:
  displaying a list comprising (i) a first group that includes one or more first graphic user interface (GUI) items and (ii) a second group including one or more second GUI items;
  displaying a title of the first group on at least one of an upper end or a lower end of a display of the one or more first GUI items;
  displaying a title of the second group on at least one of an upper end or a lower end of a display of the one or more second GUI items;
  based on a displayed list width corresponding to the first group being changed according to a scroll input with respect to the second group, displaying a modified title of the first group by changing a displayed title width of the first group based on the changed displayed list width;
  controlling the display to display a movable focus item on one of the one or more first GUI items; and
  based on the displayed list width corresponding to the first group being changed as the movable focus item is moved to another one of the one or more first GUI items or one of the one or more second GUI items according to the scroll input, controlling the display to display the modified title of the first group based on the changed displayed list width,
  wherein the one of the one or more first GUI items and the one or more second GUI items are aligned in a same direction as a scrolling direction corresponding to the scroll input,
  wherein displaying the modified title comprises, in response to the scroll input and based on a number of GUI items included in the first group displayed on the display being reduced and the displayed list width corresponding to the first group being shorter than the displayed title width of the first group, display the modified title of the first group based on a difference between the displayed title width of the first group and the displayed list width corresponding to the first group,
  wherein the displayed portion of the modified title is displayed in a same position before and after the scroll, and
  wherein the modified title is an abbreviation of the title of the first group or the title of the second group in a direction corresponding to the scrolling direction.

11. The method of claim 10, wherein the displaying the modified title comprises, based on displayed list width corresponding to the first group being changed according to the scroll input with respect to the list, changing the displayed title width of the first group such that the title of the first group is displayed within the changed displayed list width.

12. The method of claim 11, wherein the displaying the modified title comprises, based on determining that the one or more first GUI items or the one or more second GUI items included in the list are moved to one side, determining that the displayed list width corresponding to the first group is changed, and determining that a difference between the displayed title width of the first group and the changed displayed list width is within a threshold width range, abbreviating an end portion of the title of the first group to include the title of the first group within the changed displayed list width of the first group.

13. The method of claim 12, further comprising:

based on determining that the displayed list width of the first group is changed according to a reverse scroll input and determining that the difference between the displayed title width of the first group and the changed displayed list width is within the threshold width range, repeating displaying of a text of the abbreviated end portion.

14. A non-transitory computer readable medium storing computer instructions therein, which when executed by a processor in an electronic apparatus cause the processor to perform:

displaying a list comprising (i) a first group that includes one or more first graphic user interface (GUI) items and (ii) a second group including one or more second GUI items;

displaying a title of the first group on at least one of an upper end or a lower end of a display of the one or more first GUI items;

displaying a title of the second group on at least one of an upper end or a lower end of a display of the one or more second GUI items;

based on a displayed list width corresponding to the first group being changed according to a scroll input with respect to the second group, displaying a modified title of the first group by changing a displayed title width of the first group based on the changed displayed list width;

controlling the display to display a movable focus item on one of the one or more first GUI items; and based on the displayed list width corresponding to the first group being changed as the movable focus item is moved to another one of the one or more first GUI items or one of the one or more second GUI items according to the scroll input, controlling the display to display the modified title of the first group based on the changed displayed list width, wherein the one of the one or more first GUI items and the one or more second GUI items are aligned in a same direction as a scrolling direction corresponding to the scroll input, wherein displaying the modified title comprises, in response to the scroll input and based on a number of GUI items included in the first group displayed on the display being reduced and the displayed list width corresponding to the first group being shorter than the displayed title width of the first group, display the modified title of the first group based on a difference between the displayed title width of the first group and the displayed list width corresponding to the first group, wherein the displayed portion of the modified title is displayed in a same position before and after the scroll, and wherein the modified title is an abbreviation of the title of the first group or the title of the second group in a direction corresponding to the scrolling direction.

15. The non-transitory computer readable medium of claim 14, wherein the displaying the modified title comprises, based on a displayed list width corresponding to the first group being changed according to the scroll input with respect to the list, changing the title width of the first group such that the title of the first group is displayed within the changed displayed list width.

16. The non-transitory computer readable medium of claim 15, wherein the displaying the modified title comprises, based on determining that the one or more first GUI items or the one or more second GUI items included in the list are moved to one side, determining that the displayed list width corresponding to the first group is changed, and determining that a difference between the displayed title width of the first group and the changed displayed list width is within a threshold width range, abbreviating an end portion of the title of the first group to include the title of the first group within the changed displayed list width of the first group.

17. The non-transitory computer readable medium of claim 16, wherein the computer instructions further cause the processor to perform:

based on determining that the list width of the first group is changed according to a reverse scroll input and determining that the difference between the title width of the first group and the changed displayed list width is within the threshold width range, repeating displaying of a text of the abbreviated end portion.

18. The non-transitory computer readable medium of claim 14, wherein the computer instructions further cause the processor to perform:

controlling the display to display a fixed focus item on one of the one or more first GUI items, and based on the displayed list width corresponding to the first group being changed according to the scroll input, and based on another one of the one or more first GUI items is moved to a location of the fixed focus item, controlling the display to display the modified title of the first group based on the changed displayed list width.

*  *  *  *  *